United States Patent
Wojsznis et al.

(10) Patent No.: US 7,840,287 B2
(45) Date of Patent: Nov. 23, 2010

(54) ROBUST PROCESS MODEL IDENTIFICATION IN MODEL BASED CONTROL TECHNIQUES

(75) Inventors: Wilhelm K. Wojsznis, Austin, TX (US); Ashish Mehta, Austin, TX (US); Dirk Thiele, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 525 days.

(21) Appl. No.: 11/403,361

(22) Filed: Apr. 13, 2006

(65) Prior Publication Data

US 2007/0244575 A1 Oct. 18, 2007

(51) Int. Cl.
G05B 13/02 (2006.01)
G05B 11/01 (2006.01)
G06F 19/00 (2006.01)
G06F 11/30 (2006.01)
G06F 7/60 (2006.01)
G06F 17/10 (2006.01)
G21C 17/00 (2006.01)
H03F 1/26 (2006.01)
H04B 15/00 (2006.01)

(52) U.S. Cl. .............................. 700/38; 700/31; 700/37; 700/44; 700/72; 700/108; 702/182; 702/189; 703/2

(58) Field of Classification Search ............. 700/28–30, 700/40–42, 44, 47, 48, 79, 83, 95, 100, 108, 700/117, 121, 197, 198, 31, 37, 38; 702/22, 702/182, 183, 185, 189; 703/2; 706/10, 706/21, 25, 902–904, 906; 716/21

See application file for complete search history.

(56) References Cited

U.S. PATENT DOCUMENTS 5,596,704 A * 1/1997 Geddes et al. ............... 715/763
5,704,011 A * 12/1997 Hansen et al. ................ 706/25

(Continued)

OTHER PUBLICATIONS

Gustafsson, "Robust Identification of Uncertain Systems," *Research Projects at teh Process Control Laboratory*, Abo Akademi University, Sweden (1999).

(Continued)

*Primary Examiner*—Crystal J Barnes-Bullock
(74) *Attorney, Agent, or Firm*—Marshall, Gerstein & Borun LLP

(57) ABSTRACT

A robust method of creating process models for use in controller generation, such as in MPC controller generation, adds noise to the process data collected and used in the model generation process. In particular, a robust method of creating a parametric process model first collects process outputs based on known test input signals or sequences, adds random noise to the collected process data and then uses a standard or known technique to determine a process model from the collected process data. Unlike existing techniques for noise removal that focus on clean up of non-random noise prior to generating a process model, the addition of random, zero-mean noise to the process data enables, in many cases, the generation of an acceptable parametric process model in situations where no process model parameter convergence was otherwise obtained. Additionally, process models created using this technique generally have wider confidence intervals, therefore providing a model that works adequately in many process situations without needing to manually or graphically change the model.

57 Claims, 15 Drawing Sheets

U.S. PATENT DOCUMENTS

| | | | |
|---|---|---|---|
| 5,752,007 A * | 5/1998 | Morrison | 703/2 |
| 5,838,563 A | 11/1998 | Dove et al. | |
| 5,877,954 A * | 3/1999 | Klimasauskas et al. | 700/29 |
| 6,056,781 A * | 5/2000 | Wassick et al. | 703/12 |
| 6,102,958 A * | 8/2000 | Meystel et al. | 703/2 |
| 6,103,958 A * | 8/2000 | Tietz | 800/320.1 |
| 6,445,963 B1 | 9/2002 | Blevins et al. | |
| 6,484,108 B1 * | 11/2002 | Burgmayer et al. | 702/51 |
| 6,629,012 B1 * | 9/2003 | Riley et al. | 700/121 |
| 6,631,299 B1 * | 10/2003 | Patel et al. | 700/37 |
| 6,693,439 B1 * | 2/2004 | Liu et al. | 324/613 |
| 6,697,767 B2 * | 2/2004 | Wang et al. | 702/189 |
| 6,718,234 B1 * | 4/2004 | Demoro et al. | 700/269 |
| 6,721,609 B1 * | 4/2004 | Wojsznis et al. | 700/28 |
| 6,757,579 B1 * | 6/2004 | Pasadyn | 700/108 |
| 6,760,716 B1 * | 7/2004 | Ganesamoorthi et al. | 706/21 |
| 6,804,600 B1 | 10/2004 | Uluyol et al. | |
| 6,826,521 B1 * | 11/2004 | Hess et al. | 703/12 |
| 6,876,966 B1 * | 4/2005 | Deng et al. | 704/233 |
| 6,957,201 B2 * | 10/2005 | Alhadef et al. | 706/16 |
| 6,961,626 B1 * | 11/2005 | Paik | 700/31 |
| 7,085,615 B2 * | 8/2006 | Persson et al. | 700/108 |
| 7,187,989 B2 * | 3/2007 | Attarwala | 700/29 |
| 7,209,793 B2 * | 4/2007 | Harmse et al. | 700/29 |
| 7,251,807 B2 * | 7/2007 | Melvin et al. | 716/21 |
| 7,349,753 B2 * | 3/2008 | Paik | 700/110 |
| 7,403,834 B2 * | 7/2008 | Poolla et al. | 700/121 |
| 7,415,382 B1 * | 8/2008 | Bickford et al. | 702/178 |
| 7,444,191 B2 * | 10/2008 | Caldwell et al. | 700/29 |
| 2002/0022939 A1 | 2/2002 | Senta et al. | |
| 2002/0049575 A1 * | 4/2002 | Jalali et al. | 703/10 |
| 2002/0105428 A1 | 8/2002 | Benson et al. | |
| 2002/0177908 A1 * | 11/2002 | Bhat et al. | 700/12 |
| 2005/0109402 A1 * | 5/2005 | Lu | 137/392 |
| 2005/0210337 A1 * | 9/2005 | Chester et al. | 714/47 |
| 2006/0012064 A1 * | 1/2006 | Hutson et al. | 264/40.1 |
| 2006/0189009 A1 * | 8/2006 | Ahn et al. | 438/14 |
| 2007/0005266 A1 * | 1/2007 | Blevins et al. | 702/22 |
| 2007/0073539 A1 * | 3/2007 | Chengalvarayan et al. | 704/245 |
| 2007/0078529 A1 * | 4/2007 | Thiele et al. | 700/29 |
| 2009/0112335 A1 * | 4/2009 | Mehta et al. | 700/29 |
| 2009/0198350 A1 * | 8/2009 | Thiele | 700/30 |

OTHER PUBLICATIONS

Ljung, "System Identification: Theory for the User," ISBN 0-13-881640-9, *Prentice-Hall* (1987).

Press et al., "Numerical Recepies in C," *Cambridge University Press* (1997).

Qin et al., "An Overview of Industrial Model Predictive Control Technology," *Fifth International Conference on Chemical Process Control*, pp. 232-256 (1997).

Reinelt et al., "Model Error Modeling in Robust Identification," *Division of Automatic Control Report*, Linkopings University, Sweden (2001).

Stachurski et al., "Robust Identification of an Augmented Gurson Model for Elasto-Plastic Porous Media," *XXI ICTAM*, Warsaw, Poland (2004).

Wojszins et al., "Developing Confidence Intervals for Process Model Validation," *ISA Technical Conference* (2002).

Wojszins et al., "Practical Approach to Tuning MPC," accepted for publication in *ISA Transactions* (2002).

Wojsznis et al., "Easy Robust Optimal Predictive Controller," *Advances in Instrumentation and Control, ISA 2000 Conference* (2000).

Zhu et al., "Parametric Versus Nonparametric Models in MPC Process Identification," *Hydrocarbon Processing* (2000).

Search Report under Section 17(5) for Application No. GB0707141.8, dated Jun. 25, 2007.

Notification of First Office Action in Chinese Application No. 200710098116.3 from the State Intellectual Property Office of the P.R. China. (*including English translation*) dated Jan. 29, 2010.

* cited by examiner

ROBUST PROCESS MODEL IDENTIFICATION IN MODEL BASED CONTROL TECHNIQUES

FIELD OF THE DISCLOSURE

The present disclosure relates generally to process control systems and, more particularly, to the development of process models for use in advanced control routines, such as model predictive and neural network control routines used in process control systems.

DESCRIPTION OF THE RELATED ART

Process control systems, such as distributed or scalable process control systems like those used in chemical, petroleum or other processes, typically include one or more process controllers communicatively coupled each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, more recently, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input-single-output control because the control block creates a single output used to control a single process input, such as a valve position, etc. However, in certain cases, the use of a number of independently operating, single-input-single-output control loops is not very effective because the process variables being controlled are effected by more than a single process input and, in fact, each process input may effect the state of many process outputs. In these cases, the use of single-input-single-output control loops may cause the process outputs to oscillate without ever reaching a steady state condition, which is undesirable.

Model predictive control or other types of advanced control have been used in the past to perform control in these types of situations. Generally speaking, model predictive control is a multiple-input-multiple output control strategy in which the effects of changing each of a number of process inputs on each of a number of process outputs is measured and these measured responses are then used to create a model of the process. The model of the process is inverted mathematically and is then used within a multiple-input-multiple-output controller to control the process outputs based on changes made to the process inputs. In some cases, the process model includes or is developed from a process output response curve for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," *AIChE Conference,* 1996.

Moreover, the generation and use of advanced control routines such as MPC control routines has been integrated into the configuration process for a controller for a process plant. For example, Wojsznis et al., U.S. Pat. No. 6,445,963 entitled "Integrated Advanced Control Blocks in Process Control Systems," the disclosure of which is hereby expressly incorporated by reference herein, discloses a method of generating an advanced control block such as an advanced controller (e.g., an MPC controller or a neural network controller) using data collected from the process plant when configuring the process plant. More particularly, U.S. Pat. No. 6,445,963 discloses a configuration system that creates an advanced multiple-input-multiple-output control block within a process control system in a manner that is integrated with the creation of and downloading of other control blocks using a particular control paradigm, such as the Fieldbus paradigm. In this case, the advanced control block is initiated by creating a control block having desired inputs and outputs to be connected to process outputs and inputs, respectively, for controlling a process. The control block includes a data collection routine and a waveform generator associated therewith and may have control logic that is untuned or otherwise undeveloped because this logic is missing tuning parameters, matrix coefficients or other control parameters necessary to be implemented. The control block is placed within the process control system with the defined inputs and outputs communicatively coupled within the control system in the manner that these inputs and outputs would be connected if the advanced control block was being used to control the process. Next, during a test procedure, the control block systematically upsets each of the process inputs via the control block outputs using waveforms generated by the waveform generator specifically designed for use in developing a process model. Then, via the control block inputs, the control block coordinates the collection of data pertaining to the response of each of the process outputs to each of the generated waveforms delivered to each of the process inputs. This data may, for example, be sent to a data historian to be stored. After sufficient data has been collected for each of the process input/output pairs, a process modeling procedure is run in which one or more process models are generated from the collected data using, for example, any known or desired model generation routine. As part of this model determination routine, a model parameter determination routine develops the model parameters, e.g., matrix coefficients, dead time, gain, time constants, etc. needed by the control logic to be used to control the process. The control logic parameters and, if needed, the process model, are then downloaded to the control block to complete formation of the advanced control block so that the advanced control block, with the model parameters and/or the process model therein, can be used to control the process.

While this technique of generating and downloading a process controller within a process plant is useful, it relies heavily on the ability of the model creation software to be able to create or generate a process model from the data collected from the process plant during the test phase. In fact, developing a process model is the most important stage of, for example, an MPC controller implementation and, for the most part, the quality of the model defines the success of the application. Thus, the process of creating and validating the process models generated for use in the advanced control block is highly important.

Generally speaking, process model creation software may generate different types of models, including non-parametric models, such as finite impulse response (FIR) models, and parametric models, such as auto-regressive with external inputs (ARX) models. While the FIR model creation routine is generally able to produce an FIR model, FIR models generally have disadvantages in MPC controllers due to size of the memory needed to define the model and the number of computations needed for the model development. While ARX and other parametric models require less memory for defining models and less computations, there are many situations in which the parametric model creation software is unable to generate a parametric process model at all because this software is unable to converge on a solution for the model parameters. In particular, model generation techniques that rely on regressive algorithms, such as least squares, are known to have problems converging to a solution. In this case, the identified model parameters may be mathematically accurate, but are not representative of the true parameters. Because ARX and other parametric models typically do not generate an accurate estimate of the dead time of the process, they are more prone to such problems, which results in an inability to generate a model or results in a model whose parameters are numerically invalid.

In either case, the inability of the model creation software to produce a parametric model creates a problem, as the control designer must then take manual steps in an attempt to determine an adequate or appropriate parametric model to use. In the past, for example, in an attempt to enable the parametric model creation software to converge on a set of model parameters, users have added more data to the process data used to create the model, have attempted to specify various parameters, such as the dead time or one or more time constants to a greater degree, or have changed step magnitudes in the process upset signals used to create the process data. Unfortunately, none of these steps work all that well or very consistently in enabling model parameters of a parametric model to converge. Moreover, taking manual steps to alter the model creation environment requires that the control designer has the appropriate knowledge and experience of the process being controlled, as well as the appropriate analysis tools to determine an appropriate model. In many situations one or both of these elements are missing, leading the control designer to select a different type of controller format.

When a model is actually created from the data, process model review and validation may be performed to check the exactness of process model and to provide a good indication about the required robustness of the controller. For example, if the model demonstrates a significant mismatch with the process, the controller should be more robust. A typical model identification procedure involves performing a qualitative validation of the model predictions, verifying and editing the model parameters, performing a statistical model validation, and performing a model simulation. In particular, during the qualitative validation of model prediction step, simulation software applies real process input data as process model inputs and plots the actual output of the process against the predicted output for a known data set.

During the verification step, a user performs visual, e.g., graphical, inspection of the individual step response(s) for the process model(s), based on knowledge of the process, to verify that these step responses are in the expected range. Known tools that enable a user to perform numerical and graphical step response design and editing allow the user to correct the model based on (1) process knowledge, (2) information gathered by observing measurement trends and simulations, and (3) the obtained process model.

Next during a statistical model validation phase, model uncertainty is quantified using statistical techniques. These statistical techniques may include computing validation errors between actual and predicted outputs, such as root mean square (RMS), etc. For the unsatisfactory models, the average squared error is fairly high (e.g., 2.4 percent per scan). A rule of thumb may be that if the average output error exceeds one percent per scan, the associated step responses should be examined in more detail. Another statistical technique that can be used is a correlation analysis of validation errors or residuals, which explores the auto-correlation of residuals and/or the cross-correlation between residuals and the process inputs. Moreover, frequency transfer functions of process model and residuals can be computed and uncertainty bounds in frequency domain may be used to indicate quality of the model over considered frequency range.

One useful manner of defining model quality based on the developed model parameters uses the concept of model confidence intervals, which indicate a range of a specific model parameter values within a predefined probability, usually 95%. That is, confidence intervals define the range of the model parameter values in which it is predicted that the parameter values will fall within according to the predefined probability. Confidence intervals provide very important implicit information about the model identification, in that wider confidence intervals imply a less accurate model. It is commonly accepted therefore that narrow confidence intervals are more desirable. On the other hand, wider confidence intervals imply better convergence of the model parameters which is desirable when, for example, the model order does not match the process complexity or a linear model is used for modeling processes with the significant non-linearity. However, while confidence intervals help a user verify a model, they do not assist in changing the model to make the model better or more accurate.

Finally, after graphically viewing and possibly editing the process model and the process model responses, an MPC simulation using the process model provides the user with an idea of process-process model mismatch. In addition, simulation provides 'what-if' analysis prior to controller commissioning.

While these techniques are routinely employed in MPC model check out, they have inherent drawbacks. In particular, both visual observations of prediction quality and computed validation errors (RMS values, residuals, etc.) only indicate that the output prediction may be suspect. Moreover, simulation error indicating model mismatch does not provide information that can be used to improve the model. Likewise, numerical and graphical step response design and editing tools prove their utility only in the presence of expert process knowledge. Thus, while step responses can be inspected for validating gain parameters, other important information such as dynamics, gain magnitude, and time constants, which have a strong influence on the resulting controller, may not be apparent to the user. One common source of inaccuracy, for example, is the process dead time, a parameter that, in general, is not accurately known to the user and therefore cannot be accounted for easily in the model design and editing process.

Still further, noisy data, insufficient process excitation, and too short of a test time for data collection have been identified as problems that may produce a model that is not satisfactory for control purposes. None-the-less, plant conditions may not allow for a better test. Still further, statistical evaluations such as auto and cross-correlation, though useful in providing quantitative model information, have the same problem, namely non-specific information.

Consequently, in spite of the knowledge of model inaccuracy, it is difficult to determine or implement corrective action. Often, this fact requires re-identification of the model using another or a different set of data, even though only a small part of the model may be the cause of mismatch. To compound matters, the model mismatch information that can be determined is not actually reflected in the controller generation process. True model quality, therefore, is known only after the controller has been commissioned and its performance has been measured, which results in significant losses in time, money and resources, and is a disincentive for plant personnel to employ MPC technology.

In this respect, expressing confidence intervals in the time domain is a promising technique to apply as it gives model quality specifics in the form of concrete parameters for individual step responses. This technique also results in re-identification and/or correction of only a specific part of the model. Equally important, knowledge of the errors of specific parameters facilitates the selection of MPC controller generation settings that will result in a robust controller. Also, presentation in the time domain removes the complexity of using such a quality variable. However, while using confidence intervals in the time domain is useful in evaluating a process model that has been created, it is still desirable to provide a robust method of creating a process model in the first place, that can be used in controller generation, such as in MPC controller generation, in spite of tests with insufficient excitation, short data collection time frames, model constraints, such as model and process complexity mismatch (e.g., the model order does not match the process complexity or a linear model is used for modeling processes with the significant non-linearity), etc.

SUMMARY

It has been surprisingly discovered that a robust method of creating process models for use in controller generation, such as in MPC controller generation, and in particular in creating parametric process models, is obtained if noise is actually added to the process data which is collected from the process and used in the model generation process. In particular, a robust method of creating a process model, such as a parametric process model, collects process outputs based on known test input signals or sequences, adds noise, such as random noise, to the collected process data and then uses a standard or known technique to determine a process model from the collected process data. In fact, contrary to past techniques which have tried to clean up or remove noise from the process data prior to generating a process model, it has been found that adding noise to the process data enables, in many cases, the generation of an acceptable process model in situations where no acceptable process model of the same type could be generated without the addition of the noise. Additionally, it has been found that process models created using this technique generally have wider confidence intervals, therefore providing a model that fists adequately within extended confidence intervals that account for many process complexities without needing to manually or graphically change the model creation environment.

In one use of this technique, an advanced control block generation routine generates a multiple-input-multiple-output block, such as model predictive controller, a neural network modeling or control block, etc., within a process control system using a robust process model creation routine. The advanced control block may be initiated by creating a control block having desired inputs and outputs to be connected to process outputs and inputs, respectively, for controlling a process. The control block may be intended to ultimately include, for example, a complete model predictive controller, but initially has a data collection routine and a waveform generator associated therewith. If desired, the control block may have control logic that is untuned or otherwise undeveloped because this logic is missing tuning parameters, matrix coefficients or other model parameters necessary to implement the controller. The control block is placed within the process control system with the defined inputs and outputs communicatively coupled within the control system in the manner that these inputs and outputs would be connected if the advanced control block was being used to control the process. During a test procedure, the control block systematically upsets each of the process inputs via the control block outputs using waveforms generated by the waveform generator specifically designed for use in developing a process model. The control block coordinates the collection of data pertaining to the response of each of the process outputs to each of the generated waveforms delivered to each of the process inputs. This data may, for example, be sent to a data historian to be stored.

After sufficient data has been collected, a process modeling procedure is run in which noise is added to the collected process output data. This noise may be, for example, zero-mean, evenly distributed noise having a maximum amplitude from about 0.20 to about 0.5 percent of the range of the magnitude of the process output data and may more preferably be zero-mean, evenly distributed noise having a maximum amplitude of about 0.4 percent of the range of the magnitude of the process output data. A process model such as a parametric process model is then generated from the collected (and noisy) data using, for example, a model predictive controller process model generation routine such as an ARX model generation routine. Thereafter, an control block logic creates or develops the parameters needed by the control logic to be used to control the process. If desired, the created process model may be validated and the validation results may be displayed to the user in the form of a confidence plot, illustrating one or more confidence regions for the model. If desired, the confidence plots may be time domain based confidence plots, which enable the user to determine where the model is failing to match the process response, and to make changes to that part of the model if necessary.

After testing or viewing the resultant process model, the control logic parameters and the process model are then downloaded to the control block to complete formation of the advanced control block so that the advanced control block, with the advanced control logic parameters and process model therein, can be used to control the process.

DETAILED DESCRIPTION

Figure 1:
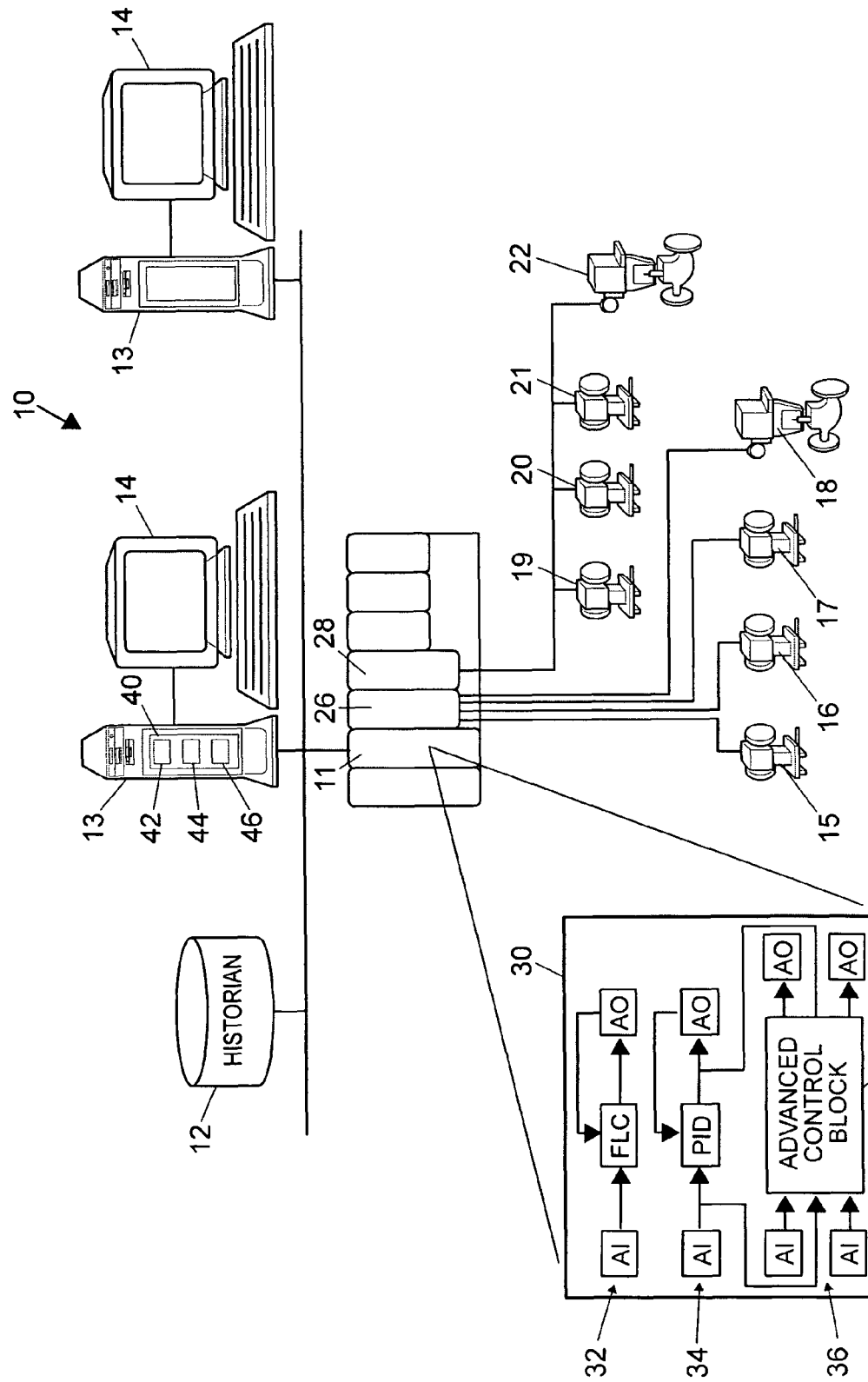
FIG. 1 is a block/schematic diagram of a process control system in which an advanced control block can be created using a robust process model generation technique described herein.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Emerson Process Management is communicatively connected to the host computers 13 and the data historian 12 via, for example, an ethernet connection or any other desired communication network. The controller 11 is also communicatively connected to the field devices 15-22 using any desired hardware and software associated with, for example, standard 4-20 ma devices and/or any smart communication protocol such as the Fieldbus protocol, the HART protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. Of course, the field devices 15-22 could conform to any other desired standard(s) or protocols, including any standards or protocols developed in the future.

The controller 11 implements or oversees one or more process control routines, which may include control loops, stored therein or otherwise associated therewith and communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this invention, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In one embodiment, the controller 11 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing signal loop control using a single-input-single-output fuzzy logic control block and a single-input-single-output PID control block, respectively, connected to appropriate analog input (AI) and analog output (AO) function blocks, which may be associated with process control devices such as valves, with measurement devices such as temperature and pressure transmitters, or with any other device within the process control system 10. Of course, the single-loop control routines 32 and 34 could include any other types of control blocks, including model based control blocks. The advanced control loop 36 is illustrated as including an advanced control block 38 having inputs communicatively connected to numerous AI function blocks and outputs communicatively connected to numerous AO function blocks, although the inputs and outputs of the advanced control block 38 may be connected to any other desired function blocks or control elements to receive other types of inputs and to provide other types of control outputs. The advanced control block 38 may be any type of multiple-input-multiple-output control block used to control two or more process outputs by providing control signals to two or more process inputs. While the advanced control block 38 will be described herein as being a model predictive control (MPC) block, the advanced control block 38 could be any other multiple-input-multiple-output block, such as a neural network modeling or control block, a multi-variable fuzzy logic control block, a real-time-optimizer block, etc. It will be understood that the function blocks illustrated in FIG. 1, including the advanced control block 38 and the single-input-single-output control blocks, can be executed by the controller 11 or, alternatively, can be located in and executed by any other processing device, such as one of the workstations 13 or even one of the field devices 19-22.

As illustrated in FIG. 1, one of the workstations 13 includes a control block generation routine 40 that is used to create, download and implement the advanced control block 38 in a manner described in more detail herein. While the control block generation routine 40 may be stored in a memory within the workstation 13 and executed by a processor therein, this routine (or any part thereof) may additionally or alternatively be stored in and executed by any other device within the process control system 10, if so desired. Generally speaking, the control block generation routine 40 includes a control block creation routine 42 that creates an advanced control block and that connects this advanced control block into the process control system, a process modeling routine 44 that creates a process model for the process or a portion thereof based on data collected by the advanced control block, and a control logic parameter creation routine 46 that creates control logic parameters for the advanced control block from the process model and that stores or downloads these control logic parameters in the advanced control block for use in controlling the process. It will be understood the routines 42, 44 and 46 can be made up of a series of different routines, such as a first routine that creates an advanced control element having control inputs adapted to receive process outputs and having control outputs adapted to provide control signals to process inputs, a second routine that enables a user to communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that creates a process model from the collected data, a sixth routine that develops advanced control logic parameters from the process model and a seventh routine that places the advanced control logic and, if needed, the process model within the advanced control element to enable the advanced control element to control the process. While the control block generation routine 40 is described herein as being used to create a multiple-input-multiple-output control block, the routine 40 could be used to create a single-input-single-output, a multiple-input-single-output, or a single-input-multiple-output control block or other type of block, such as a modeling block, etc.

Figure 2:
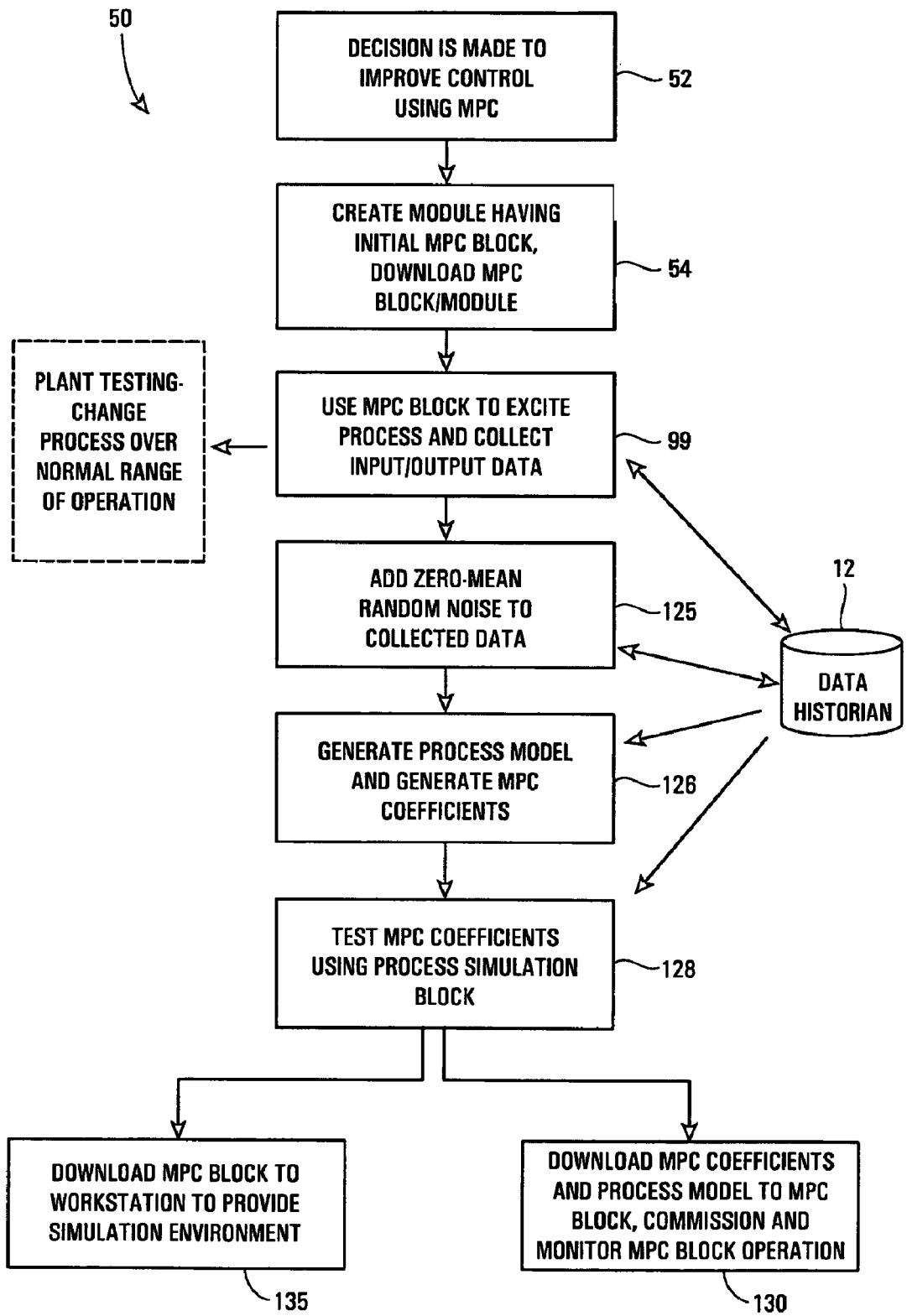
FIG. 2 is a flow diagram illustrating the operation and creation of an advanced control block within the process control system of FIG. 1.

Referring now to FIG. 2, a flowchart 50 illustrates the steps of creating and using an model based control block and, in particular, an MPC control block, within a process control system, such as the process control system 10 of FIG. 1, in a manner that includes robustly generating one or more process models for use in the control block. Here, robustly generating a process model generally means being able to generate a process model that meets one or more statistical measures of process match to the process to provide acceptable control block operation in spite of the presence of various factors which typically limit the ability to produce such a process model, such as minimal process data, process model and process complexity mismatch, etc. While the flowchart 50 of FIG. 2 illustrates the creation of an MPC block or module, the same or similar steps could be performed to create and use any other model based block such as any multiple-input/multiple-output block like a neural network modeling or control block, a multi-variable fuzzy logic control block, etc.

At some initial time (block 52), a decision is made to improve or provide control within the process control system 10 by implementing an MPC procedure. This decision may be made at the time the process control system 10 is first set up or at some later time after, for example, other control routines, such as single-loop control routines, have been found to provide inadequate control. At the block 52, an operator or other user executes the MPC block generation routine 40 to begin the steps of creating an MPC module or control loop within the process control system. As part of this process, the operator chooses the process inputs to which the outputs of the MPC block being designed are to be connected and chooses the process outputs to which the inputs of the MPC block being designed are to be connected. While the MPC block may have any number of inputs and outputs, each MPC block generally has three kinds of inputs including controlled parameter inputs which are the process variables or parameters that are to be maintained at a set point (or within a set range), constrained inputs which are the process variables that are constrained to a particular limit or range based on, for example, physical limitations associated with the process and which the MPC block must not force to be outside of the constrained range or limit, and process disturbance parameter inputs, which are other process variables, such as process inputs that, when altered, are known to cause changes to the controlled parameters. The MPC block uses the process disturbance parameter inputs to foresee changes to the controlled parameters (i.e., the controlled process outputs) and to limit the effects of these changes before they occur. Other inputs may also be provided to the MPC block, such as feedback from a device or other process element being controlled which enables the MPC control block to provide more effective control of these elements. Similarly, the outputs of the MPC block may be connected to control any desired process variable or other process input including control loop inputs, device control inputs, etc. The routine developed by connecting the MPC block to other control elements is referred to herein as an MPC module. While the user may create an MPC function block, the user may also obtain an initial function block from a memory, such as a library of function blocks, and use this function block or create an instance of this function block for use in the process control system. Likewise, a user or other provider may provide a function block or other control element in any other desired manner.

At a block 54, the operator creates an MPC module having an MPC block (which does not yet have all of the information needed to provide model predictive control) with the specified inputs and outputs communicatively connected within the process control system and downloads the block or module to the appropriate controller or other device that will implement the MPC module. As part of this process, the operator configures the process control system 10 to implement the MPC block by communicatively coupling the outputs of the MPC block to the appropriate process inputs and by communicatively coupling the inputs of the MPC block to the appropriate process outputs.

Figure 3:
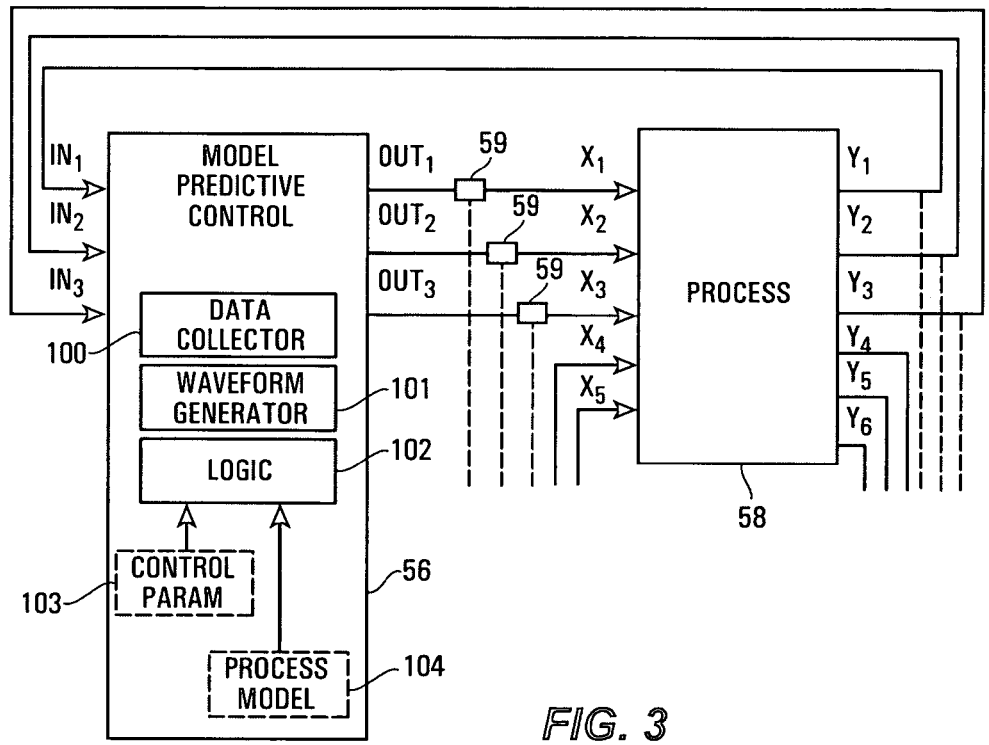
FIG. 3 is a block diagram of a model predictive control block connected within a process control routine to control a process.

Referring to FIG. 3, an MPC block 56 is illustrated as being connected to a process 58. The MPC block 56 is a 3×3 control block having three inputs $IN_1$-$IN_3$ and three outputs $OUT_1$-$OUT_3$ while the process 58 includes inputs $X_1$-$X_5$ and outputs $Y_1$-$Y_6$. Of course, the MPC block 56 and the process 58 could include any other numbers of inputs and outputs. While the MPC block 56 may generally be a square block, i.e., having the same number of inputs as outputs, this configuration is not necessary and the MPC block 56 may have different numbers of inputs and outputs. As illustrated in FIG. 3, the operator communicatively connects the process outputs $Y_1$-$Y_3$ to the MPC block inputs $IN_1$-$IN_3$, respectively, and communicatively connects the MPC block outputs $OUT_1$-$OUT_3$ to the process inputs $X_1$-$X_3$, respectively. Of course, any of the inputs and outputs of the process 58 may be connected to other control loops or to other elements within other control routines associated with the process control system 10 (as indicated by dotted lines connected to the process inputs and outputs in FIG. 3). Generally speaking, the MPC block 56 and the other blocks which may be providing control inputs to the process 58 (as illustrated by dotted lines connected to the process inputs $X_1$-$X_3$) will be connected through a switch of some sort, these switches being illustrated by the boxes 59 in FIG. 3. The switches 59 may be hardware or software switches and, if desired may be provided by having the different control input signals delivered to different inputs of a function block, such as a Fieldbus function block, which can then select between the control signal from the MPC block 56 and a control signal from a different function block, such as from a PID function block, based on the mode of the function block receiving the two signals.

Of course, the operator can connect the MPC block 56 to the process 58 in any desired manner and, generally speaking, will use the same control configuration or design program that the operator uses to create other control loops like single-loop control routines within the process control system 10. For example, the operator may use any desired graphical programming routine to specify the connections between the MPC block 56 and the process inputs and outputs. In this manner, the MPC block 56 is supported in the same way as other control blocks, elements or routines, which makes configuration and connection of the MPC block 56 and support of that block within the control system 10 no different than the configuration, connection and support of the other blocks within the system. In one embodiment, the MPC block 56, as well as the other blocks within the control system 10, are function blocks designed to be the same as or similar to Fieldbus function blocks. In this embodiment, the MPC block 56 may have the same or similar types of inputs, outputs, etc. as specified or provided in the Fieldbus protocol and is capable of being implemented by, for example, the controller 11 using communication links which are the same as or similar to those specified by the Fieldbus protocol. A method of graphically creating process control routines and elements thereof is described in Dove et al., U.S. Pat. No. 5,838,563 entitled "System for Configuring a Process Control Environment" which is hereby expressly incorporated by reference herein. Of course, other control loop or control module design strategies could be used as well, including those which use other types of function blocks or which use other routines, sub-routines or control elements within a process control configuration paradigm.

When using a control system based on the interconnection of function blocks, such as those provided by the Fieldbus function block paradigm, the MPC block 56 can be connected directly to other function blocks within the process control routine. For example, the MPC block 56 may be connected to control devices, such as valves, etc. directly by connecting a control output of the MPC block 56 to an output block (such as an AO block) associated with the device being controlled. Likewise, the MPC block 56 may provide control signals to function blocks within other control loops, such as to the input of other control function blocks, to oversee or override the operation of these control loops.

As will be understood, and as described in more detail in U.S. Pat. No. 6,445,963, the process inputs $X_1$-$X_3$ to which the outputs of the MPC control block 56 are connected in FIG. 3 may be any desired process inputs including inputs to control loops defined within an existing control strategy or inputs to valves or other devices connected to the process. Likewise, the process outputs $Y_1$-$Y_3$ connected to the inputs of the MPC block 56 may be any desired process outputs including outputs of valves or other sensors, outputs of AO or AI function blocks or outputs of other control elements or routines.

Referring again to the step 54 of FIG. 2, once the operator has created a control module including an initial MPC block having the inputs and outputs connected to desired process outputs and inputs, respectively, the control module having the initial MPC block therein is downloaded into the appropriate device, such as the controller 11 or one of the workstations 13, for execution. Next, at a step 99, the operator instructs the initial MPC block to begin to excite the process in known manners and to collect process input and output data while the process is being excited.

As illustrated in FIG. 3, the initial MPC block 56 includes a data collection routine 100, a waveform generator 101, generic control logic 102 and storage for storing control parameters 103 and a process model or model parameters 104. The generic logic 102 may be, for example, a generic MPC routine that needs coefficients or other control parameters to be able to operate to perform control in a particular instance. In some cases, the generic logic 102 may also need a process model or model parameters for the process being controlled to control that process. After being downloaded into, for example, the controller 11, the initial MPC block 56 is instructed, via the MPC creation routine 42, to begin the next phase of development of the MPC block 56 in which data is collected for each of the process outputs for use in creating a process model. In particular, when instructed to do so by the operator (or at any other desired time), the waveform generator 101 of the MPC block 56 begins to produce a series waveforms at the outputs $OUT_1$-$OUT_3$ thereof so as to provide excitation waveforms to each of the process inputs $X_1$-$X_3$. If desired, these waveforms may be provided to the generator 101 by software within the user workstation 13, but are preferably created by the generator 101. The waveforms generated by the waveform generator 101 are preferably designed to cause the process to operate over the different ranges of inputs expected during normal operation of the process. To develop a process model for an MPC control routine, the waveform generator 101 may deliver to each of the process inputs $X_1$-$X_3$, a series of different sets of pulses, wherein the pulses within each of the sets of pulses have the same amplitude but have pseudo-random lengths and wherein the pulses within the different sets of pulses have different amplitudes. Such a series of set of pulses may be created for and then delivered to each of the different process inputs $X_1$-$X_3$ sequentially, one at a time. During this time, the data collection unit 100 within the MPC block 56 collects or otherwise coordinates the collection data indicating the response of the process outputs $Y_1$-$Y_3$ to each of the waveforms generated by the waveform generator 101 and may collect or coordinate the collection of data pertaining to the excitation waveform being generated. This collected data may be stored in the MPC block 56 but, preferably, is automatically sent to the data historian 12 for storage and/or to the workstation 13 where this data may be displayed on the display screen 14.

Thus, instead of trying to control the process 58 using some advanced control logic (which has not yet been completely developed), the MPC block 56 first provides a set of excitation waveforms to the process 58 and measures the response of the process 58 to these excitation waveforms. Of course, the excitation waveforms generated by the waveform generator 101 may be any desired waveforms developed to create a process model useful for the creation control logic parameters for any model based control routine. In this example, the waveform generator 101 generates any set of waveforms that is known to be useful in developing a process model for a model predictive controller, and these waveforms may take any form now known or developed in the future for this purpose. Because waveforms used to excite a process for the purpose of collecting data to develop a process model for model predictive control are well known, these waveforms will not be described further herein. Likewise, any other or any desired types of waveforms may be generated by the waveform generator 101 for use in developing process models for other advanced control applications (which includes modeling), such as neural networks, multi-variable fuzzy logic, etc.

It should be noted that the waveform generator 101 may take any desired form and may, for example, be implemented in hardware, software or a combination of both. If implemented in software, the waveform generator 101 may store an algorithm that can be used to generate the desired waveforms, may store digital representations of the waveforms to be generated, or may use any other routine or stored data to create such waveforms. If implemented in hardware, the waveform generator 101 may take the form of, for example, an oscillator or a square wave generator. If desired, the operator may be asked to input certain parameters needed or useful in the design the waveforms, such as the approximate response time of the process, the step size of the amplitude of the waveforms to be delivered to the process inputs, etc. The operator may be prompted for this information when the MPC block 56 is first created or when the operator instructs the MPC block 56 to begin to upset or excite the process and collect process data. In a preferred embodiment, the data collection unit 100 collects (or otherwise assures the collection of) data in response to each of the excitation waveforms for three or five times the response time input by the operator to assure that a complete and accurate process model may be developed. However, data may be collected for any other amount of time.

The MPC control block 56 preferably operates until the waveform generator 101 has completed delivering all of the necessary excitation waveforms to each of the process inputs $X_1$-$X_3$ and the data collection unit 100 has collected data for the process outputs $Y_1$-$Y_3$. Of course, the operation of the MPC block 56 may be interrupted if so desired or if necessary during this data collection process.

Figure 4:
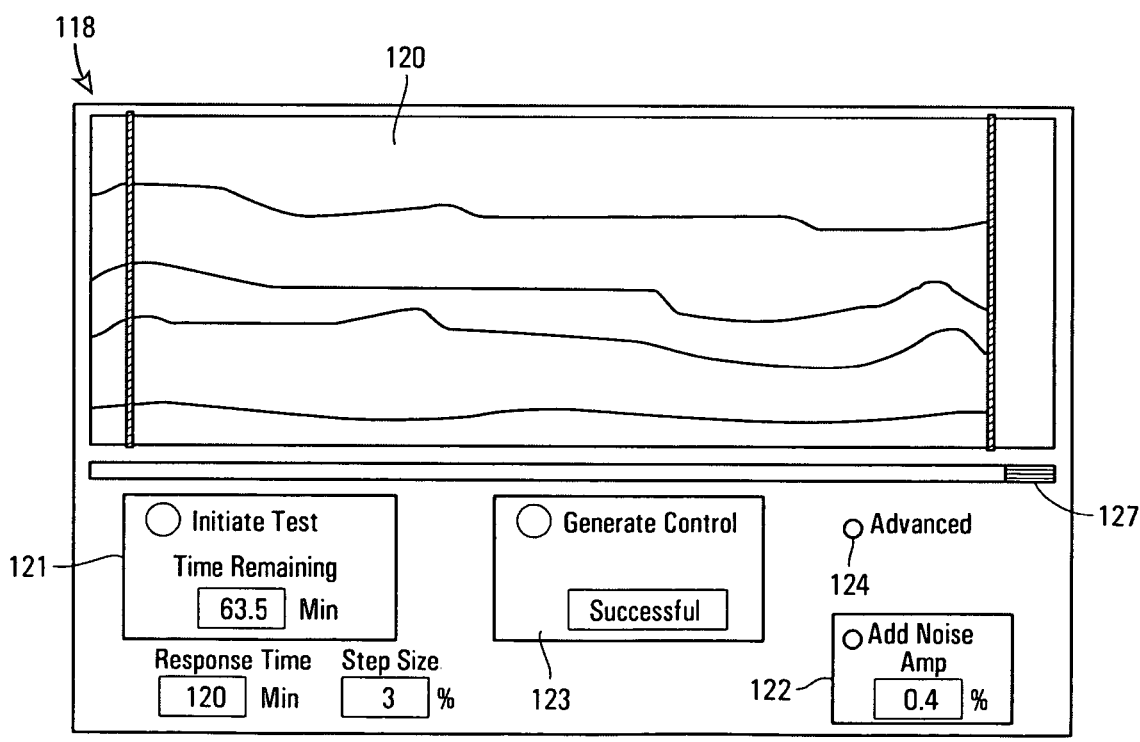
FIG. 4 is an example screen display which may be presented to a user in the process of creating an MPC control routine and that enables the user to add noise to collected process data prior to creating one or more process models from the collected process data.

Referring to FIG. 4, a screen display 118 which can be presented to the operator on one of the displays 14 by the control logic generation routine 40 enables an operator to implement the different steps of generating an advanced control block. In particular, the screen display 118 includes a data display area 120, and four buttons 121, 122, 123 and 124 which may be used to initiate different parts of the control block generation routine 40 (FIG. 1). The Initiate Test button 121 enables the operator to cause the initial MPC block 56 to send excitation signals to the process 58 and to collect input and output data for delivery to the data historian 12. The button 121 may illustrate, for example, the time remaining for performing the excitation routine, i.e., the time it will take the MPC control block 56 to generate all of the excitation waveforms and to collect the process data generated in response to these waveforms. Before pressing the button 121, the operator may input a response time indicating a typical time that it takes the process to respond to an input and may indicate or specify the step size which is used to used by the MPC block 56 to generate the excitation waveforms, which data may be provided to the waveform generator 101 of the MPC block 56. After pressing the button 121, the data collected by the MPC block 56 may also be displayed on the data display area 120 and, if desired, the user may flag data (using lines or bars, for example) that should not be used to create a process model or that should be excluded from the data used to create a process model. It should be understood that the data collection unit 100 may collect data by assuring that this data is sent to the data historian 12 or other storage device for storage.

After collecting the process data, the operator may, at some point, decide to implement the next phase of developing the MPC block by creating one or more process models from the collected process data to be used in the MPC controller or other model based control block. Before or as part of this procedure, the operator may initiate a block 125 of FIG. 2 that adds noise, and preferably zero-mean, evenly distributed, random noise, to the collected process data to preprocess this data in a manner that enables a more robust generation of a process model from this data. The operator may add this noise to the collected data (which may be illustrated in the area 120 of the screen display 118 of FIG. 4) by selecting the button 122 illustrated in FIG. 4. At this time, the operator may select the desired amplitude of the noise to be added. Generally speaking, it has been found that using random, evenly distributed, zero-mean noise having a maximum amplitude between about 0.2 percent and 0.5 percent of the normalized range of the process data (i.e. of range of the amplitude of the collected process data) works well to provide for a robust process model creation routine. More preferably, it has been found that using a zero-mean, evenly distributed random noise having a maximum amplitude of about 0.4 percent of the process data range works particularly well. However, other types of noise could be used as well, including non-random noise, other noise distributions, such as a normal (Gaussian) distribution, and other amplitudes including less than 0.2 percent or greater than 0.5 percent of the data range.

Additionally, if desired, the magnitude or amplitude of the noise could be automatically selected based on other factors in the process test, such as the magnitude of the step signal used to upset the process, the change in the process data in response to the test, etc. Thus, generally speaking, the amplitude of the noise may be automatically set as a function of the collected process data or of the process input signal. As an example only, the amplitude of the noise may be determined as a function of a statistical measure of the collected process data, such as the range of the collected process data, the mean of the collected process data or a standard deviation of the collected process data, or as a function of a process input signal such as a factor of the magnitude of the input process upset signal used to generate the collected process data. In one particular example, if the process data changes by 2% in the test cycle, the noise may have a magnitude of 0.2%, while if the magnitude of the step test signal input to the process is 5% of the possible range, the noise magnitude may be 0.5%. Of course, some other multiplier (besides 10 percent) could be used to relate the noise magnitude to other factors used in the test. Still further, it will be understood that, when determining multiple process models or when determining a process model from multiple inputs to the process and/or from multiple process outputs, the amplitude or type of noise added to the collected process data may be different for each set of collected process output data. Thus, the noise amplitude may be set differently for each different process upset signal and/or for each set of collected data pertaining to a different process output.

After noise is added to the process data by the block 125 of FIG. 2, this data may be stored in the historian 12 or may be provided directly to the model creation routine 44 (FIG. 1). In particular at a block 126 of FIG. 2, the user may execute the process modeling routine 44 which accesses the collected and artificially noisy data from the data historian 12 and runs any known process model generation routine to create a process model from the collected and artificially noisy data. (As used herein, the term "artificially noisy data" is used to mean data to which noise has been intentionally added in some form.) Generally speaking, the operator may initiate this phase by selecting the Generate Control button 123 on the screen display of FIG. 4.

If desired, the process modeling routine 44 may run a data screening procedure on the collected data. This data screening procedure may check the collected data for outliers and other obviously erroneous data and may check other values associated with the collected data, such as status and limit values associated with the collected data, to determine if the data was generated by a function block having a bad or improper status, if the data was at a limit, if the data was generated when a function block or other element was in an improper mode, or if the data was, in some other way, generated under abnormal or undesirable process conditions. For example, in the Fieldbus communication protocol, data generated by function blocks also includes a status, a limit and a mode indication which can be stored with the data in the data historian 12 and used to screen the data. If desired, the data screening routine may illustrate the collected data to the operator on the data display area 120 of FIG. 4 and enable the operator to mark the data to be screened or eliminated, by for example, highlighting or otherwise identifying this data, based on the operator's knowledge of the process conditions. In this manner, data that was collected by the MPC block 56 when the process 58 was off-line, when the process 58 was not being controlled properly, when the process 58 was under repair, when a sensor or other device within the process 58 was faulty or being replaced, etc. may be selected and eliminated from the data to be used to create a process model. Of course, this data screening step may be performed before or after or as part of the block 125 of FIG. 2 and therefore may be performed in conjunction with and/or as part of the process of adding random noise to the collected process data.

As illustrated in FIG. 4, a trend may be displayed in the display area 120 containing the MPC inputs and outputs as a trend plot. The plot can be auto-scaled based on the values of the inputs and outputs. Also, the time frame of the portion of the plot that is displayed will, preferably, be two times the specified response time. By using a slider bar 127, the time window may be changed to show values that go back to some previous time, such as the last two days. To enable good data to be collected on plant operation, an automated test feature may be used. By selecting the Initiate Test button 121, the process inputs that will be manipulated by the MPC block are bumped by the specified step size in a pseudo-random sequence over the specified response time. Also, when the Initiate Test button 121 is selected, start and end divider bars on the data display may be automatically set to mark the start and end of the automated testing and the MPC block 56 may overtake control of the manipulated outputs by providing the pseudo-random sequence of output signals as excitation waveforms to the process 58.

The time bars or data window in the area 120 may also be used to select the data that is to be used to develop the process model. An operator may select one of the divider bars and drag it to the desired start or end time to change the time frame considered for process model identification. If part of the time between the start and end bar is not representative of normal plant operation, then the user or operator can specify this section of time to select data values to be ignored during the process model identification process. In response, the selected area may be shown in a darker background color or specified in some other manner and will automatically be excluded when creating the process model.

After screening the data and adding the random noise thereto, the process modeling routine 44 creates a process model from the selected data. As noted above, the process modeling routine 44 may perform any desired or known type of process modeling analysis to develop a process model from the collected and screened data and the developed process model may take on any form, such as a mathematical algorithm, a series of response curves, etc.

If the process modeling routine 44 has a problem determining the process model, then an indication of the problem may be reflected in a status area of a user display, such as that of FIG. 4. One problem that may be indicated is that there are not enough samples to identify or create a process model. A message such as "For the defined configuration, a minimum number of XXX samples is required. Data file contains only XXX samples" may be generated to notify the operator of this problem. Another problem that may be detected is that not enough excitation occurred on the process inputs. A message to this effect and identifying the signal tag names, such as TagX, TagY, etc. and the minimum changes to the excitation amount can be provided to the operator is such a problem occurs.

If desired, and based on the conditions that prevented a successful model being identified, the user may change the time frame over which the process modeling is performed, or change process inputs so that the data used in process modeling routine 44 is valid. The process model that is identified may be automatically saved in any desired database to be accessible for later use. More experienced users may want to examine or edit the process model that was identified. By selecting the Advanced button 124 on the screen of FIG. 4, the user can be given a choice of generating an MPC controller from a selected model and the current MPC function block configuration or editing a specific model and saving the resulting model as a new model to be used to create MPC control logic. When the generate controller option is selected, the user may be presented with a dialog from which he or she may select a model that has been previously saved for the MPC block in the MPC module that is being edited. By selecting the edit option, the user can be presented with a list of the models that have been developed for the MPC module in question. After selecting a model, the user may be taken to a screen that displays an overview of the process step response and to other screens, as described hereinafter, to edit process step responses to create a new or altered module.

At some point in the process, the logic parameter creation routine 46 may be executed to create the parameters (to be stored in the variables within the MPC block 56) needed by the generic logic 102 of the initial MPC block 56 to perform model predictive control. These control parameters, which may be, for example, matrix or other MPC coefficients for MPC logic, tuning parameters, neural network parameters (for a neural network), scaling factors (for multi-variable fuzzy logic) or any other desired parameters, are usually determined based on the generated process model. The logic parameter creation routine 46 may perform any desired or known procedure for creating the parameters from a process model. Generally speaking, this process entails inverting the process model in a matrix format. However, any other desired logic parameter creation routine could be used. Because the specifics of creating a process model from data for a process and generating MPC or other control logic parameters from that process model is known in the art, these procedures will not described further herein. It should be noted, however, that the operator may have some input on the creation of the control logic parameters for the MPC block 56. In fact, the operator may be requested or otherwise be given the ability to specify the values of certain variables typically used to create an MPC controller. For example, the operator may specify the set points and limits of each of the constrained inputs to the MPC block, the time frame over which control changes are to be made, i.e., the set point trajectory filter and the time constants associated with this filter, the maximum or minimum movement (rate limit) of an MPC output or a process output, whether any of the controlled parameters respond in an integrated manner, MPC optimization factors, variables or tuning parameters, the horizon of the MPC control block, i.e., how many steps forward calculations are to be performed to control to a desired state, the engineering unit ranges for each of the inputs and outputs of the MPC block 56, which of the manipulated variable targets will be allowed to be relaxed or not realized when one of the constraints is violated, a description and/or name of each of the MPC block inputs and outputs, the value of any optimization variables that can be set, the value of variables related to the aggressiveness or robustness of the MPC block, etc. If desired, the control logic generation routine 46 may store default values for some or all of these variables or settings and use these default values to create the MPC logic. However, the operator or other user may be able to change these settings via the user display 14.

In any event, the MPC logic parameter creation routine 46 executes using this information and any other information that may be needed to create MPC (or other) control logic parameters, such as MPC coefficients. The Generate Control button 123 on the screen display 118 may indicate whether or not the creation of a process model and control logic parameters was successful.

After the MPC control logic parameters are created, at a step 128 of FIG. 2, the MPC control logic parameters or coefficients may be tested using a process simulation block. This simulation block may generally be developed from the process model created for the process and can be connected to an MPC block in a testing environment as described in U.S. Pat. No. 6,445,963 to test whether the created MPC control logic operates satisfactory over the range of normal operation of the process. If the MPC logic is not satisfactory, any or all of the steps 54, 99, 125, 126 and 128 may be repeated to develop different MPC control logic. However, if the MPC control logic is satisfactory, the MPC control logic parameters and the process model may be downloaded at a step 130 to the MPC block 56 to be stored in the parameter storage 103 and the process model storage 104 to be used to control the process 58. In this manner, the parameters needed by the MPC control logic are provided to and contained within the MPC block 56 and the MPC block 56 can be commissioned to operate or to actually perform control within the process according to the MPC control logic 102. Of course, if desired, the actual MPC logic 102 along with the parameters needed therefor can be created in the workstation 13 and downloaded to the MPC block 16. Moreover, if desired, the created MPC control block or model may be provided at a block or step 135 (FIG. 2) to a workstation or other computer device to be used as part of a simulation environment.

Once downloaded and executed by the controller 11, the MPC module or loop having the MPC block 56 therein may perform reporting functions in the same manner as other blocks or elements within the control routine because, as noted above, the MPC block 56 and the control module including this block are designed using the same programming paradigm as the other control blocks within the process control system 10. In one embodiment, the MPC block or module may have graphical views associated therewith that can be displayed to a user or operator via, for example, one of the display screens 14 of one or more of the workstations 13, these views subscribing to data associated with the blocks within the MPC control module and displaying this data in a predefined or specified manner.

While the method of creating a process model from collected process data that adds noise to the collected process data has been described herein as being implemented in conjunction with the creation of an MPC control block that is downloaded to a controller of a process plant during the configuration of the process plant, it should be noted that the concept of adding noise to collected process data prior to creating a process model from that data can be implemented in any other context or environment for any desired type of process model. Thus, this feature can be used in creating process models for MPC control applications, neural network modeling and/or control applications, or any other situation in which a process model needs to be created for a process from collected process data. Moreover, the feature of adding noise to the collected process data prior to creating a process model from that data may be used in single-input-single-output, or single-input-multiple-output, or multiple-input-multiple output, or multiple-input-single-output control or modeling situations or other non-control applications, such as modeling and prediction applications. Likewise, the process data to which the noise is added may be collected from the process in any manner including in any manner other than that described herein. Likewise, while the actual model developed from the collected process data pre-processed with noise may be finite impulse response (FIR) models or parametric models such as auto-regressive with external inputs (ARX) models (as described in more detail herein), any other types of process models may be created from this data instead of or in addition to these types of models.

Figure 5:
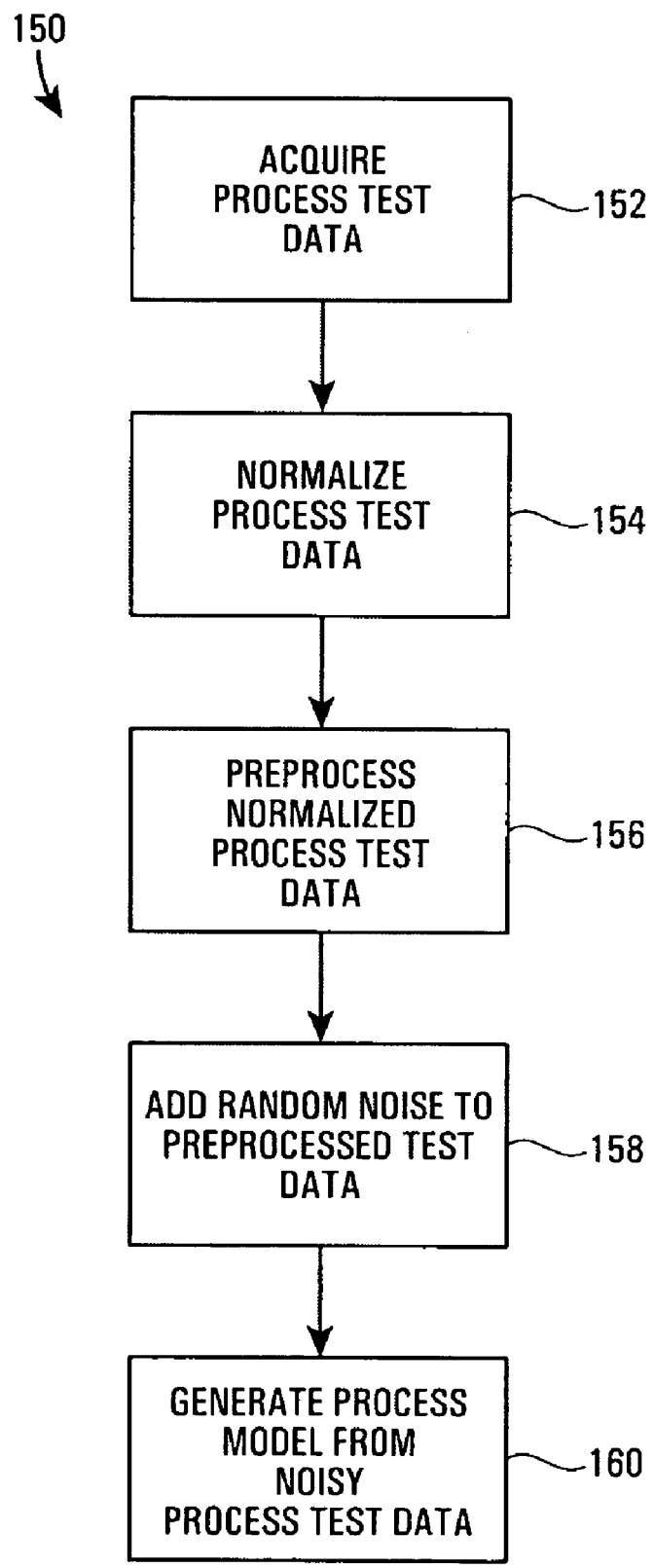
FIG. 5 is a flow chart of a first robust method of generating a process model from a set of test data collected from a process using the addition of random noise.

Thus, as illustrated in FIG. 5, a generalized robust method 150 for creating a process model from process data or test data is illustrated. The method 150 generally includes acquiring a set of process test data at a block 152 and performing data normalization on the process test data at a block 154. Of course, the process test data may be acquired in any manner using any desired process upset techniques or waveforms. Furthermore, any known data normalization techniques may be performed on the test data. At a block 156, the normalized process test data may be preprocessed or screened to, for example, eliminate outliers, delete or exclude sections of the data that may have been acquired during abnormal process operation or in the presence of some other disturbance in the process which does not reflect standard process operation, etc. Next, at a block 158, noise, such as zero-mean, random noise is added to the pre-processed normalized data. As indicated above, zero-mean random noise on the order of 0.2 to 0.5 percent of the normalized range may be added to the normalized and pre-processed test data, although other magnitudes of noise may be used instead. A block 160 then uses the noisy process test data produced by the block 158 to generate one or more process models from the data using any known or desired model generation technique.

While FIG. 5 illustrates that the noise may be added to normalized process test data after that data has been pre-processed or screened, it is not necessary in all cases to normalize the process test data or to pre-process or screen that process test data to, for example, remove outliers or other bad data as defined by a user or some statistical method. Still further, while FIG. 5 illustrates that the noise is added to the process test data after that data has been generated, it has been found that the noise may be added to the signal waveforms used to generate the process test data to thereby add noise to the collected process test data. In this case, it is assumed that non-noisy process upset signal or signal waveforms were used to generate the collected (and thus noisy) process test data when evaluating that data for the purpose of generating a process model.

It has also been found that the technique of adding noise to process test data actually works well to robustly find process models in the presence of noisy process test data in the first place, in that the addition of zero-mean, random noise to noisy data does not actually increase the level of the noise in the data above the amount of noise added. In particular, because the noise being added is not correlated with the noise already within the test data as collected, the added noise does not actually increase the level of noise of the data above the level of the added noise. In fact, when added across noisy and non-noisy data, such as when developing multiple process models for the same process, the addition of noise evens out the amount of noise within the data collected from various sources within the process, thereby providing for a better or more correlated set of process models for the process.

It has also been found that the technique of adding noise to the process test data generally works better when determining a parametric model, such as an ARX model, as compared to a non-parametric model, such as an FIR model. Generally speaking, parametric models employ a finite-dimensional parameter vector in the search for a best description, while the best description in a non-parametric model requires an infinite dimensional parameter vector. The key difference between the parametric and non-parametric model types is that a parametric model is much more compact and needs fewer parameters to describe the same dynamic behavior than a non-parametric model. In the literature, FIR is called a non-parametric model while forms such as ARX, ARMAX, Box-Jenkins, and Output Error (OE), etc., are called parametric models. The term non-parametric is not meant to imply that such models completely lack parameters; rather, that the number and nature of the parameters is flexible and determines the degree of truncation. For example, in an FIR model, the number of scans used to define the model establishes the dynamic range of the model. Non-parametric models are also sometimes referred to as distribution free.

Figure 6:
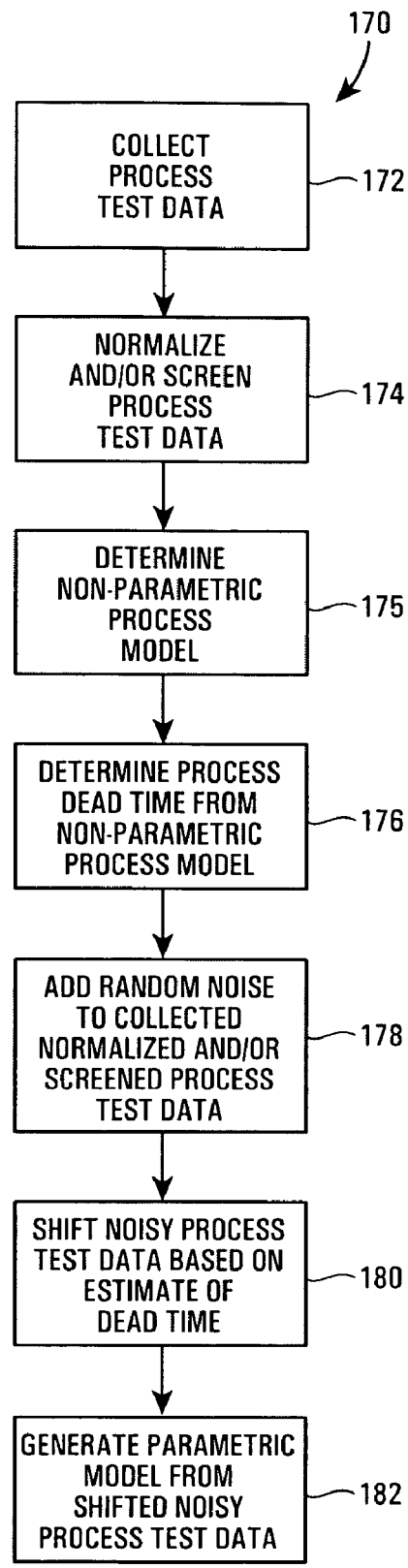
FIG. 6 is a flow chart of a second robust method of generating a parametric process model from a set of test data collected from a process using the addition of random noise.

As is known, low order parametric models are not generally able to produce a good or valid estimate of the dead time of a process for use in the process model, while FIR models generally produce good estimates for process dead time. As a result, one very useful method of determining a parametric model, such as an ARX model is illustrated by the flowchart 170 of FIG. 6. In particular, at a block 172, process test data is first determined for the process. At a block 174, this process test data may be normalized and screened to remove outliers, bad data, etc. Then, at blocks 175 and 176, an estimate of the dead time of the process is determined from the process test data. In one example, the block 175 first generates a non-parametric model, such as an FIR model of the process, from the process test data and the block 176 then determines the process dead time from that non-parametric process model. Generally speaking, the estimate of the process dead time may be established as the time until the output of a modeled FIR process response crosses the zero normalized threshold. However, while determining an estimate of the process dead time may be performed by generating an FIR or other non-parametric model from the collected process data, blocks 175 and 176 may be replaced with any other known or desired method of determining the process dead time including ones that do not generate a process model.

Thereafter, at a block 178, random, zero-mean noise of a desired amplitude may be added to the process test data. At a block 180, the process test input signal may be shifted in time to account for the determined process dead time, to thereby remove the process dead time from the collected and artificially noisy process data. Of course, the order of the operations of the blocks 178 and 180 is not important and may be reversed or performed simultaneously. At a block 182, a parametric model generation routine may be used to generate a parametric process model from the artificially noisy and shifted process data by determining values for the parameters of the parametric process model in any known manner. Of course, shifting the process input data based on the determined process dead time may occur during the process of determining the parameterized process model, and could thus be an integral part of the calculations implemented in determining the process model.

In general, the process of adding noise to the collected process data increases the standard deviation of the process data, which basically enables the parametric model creation routine to converge on a set of model parameters using the noisy data in cases when the routine is unable to do so on the raw (non-noisy) data. Still further, it is believed that the addition of the noise to the process data conditions the data in a manner that enables a parametric model creation routine to converge on a set of model parameters that basically estimate the process as well or as close as model parameters that would have been determined from the raw data, but to be able to do so in many situations in which the parametric model creation software would have been unable to actually converge using the raw data.

There are several basic techniques of process model validation from which it is possible to measure the robustness of the process used to generate process models and in particular to measure the improvement in model parameter convergence. As described above, it has been found that confidence intervals strongly relate to noise and therefore that confidence intervals (which are closely related to the standard deviation of the data) can be widen by superimposing a small level noise on the test data. As noted above, this technique enables a parametric model to be achieved from data that has not before provided model parameter convergence. As a result, the robustness of the model development technique is significantly increased.

Development of a satisfactory process model is at the core of Model Predictive Control (MPC) technology. While various types of models are used with MPC, the FIR and ARX models are probably the most commonly used in industrial practice. A concise review of model types and their features is given in Zhu, Y., Arrieta, R., Butoyi, F., and Cortes, F., "Parametric Versus Nonparametric Models in MPC Process Identification," *Hydrocarbon Processing*, February, 2000. As indicated above, one of the primary criteria for model evaluation is the use of confidence interval with calculations performed in the frequency or time domain and for this measurement, narrow confidence levels are desirable. However, another model identification feature, robustness, is not so clearly defined. Generally speaking, however, the model identification problem results in an optimization problem, solved by least squares techniques or maximum likelihood techniques or variations of these techniques. While many known methods deliver reliable nominal models and acceptable related uncertainties, due to the different approaches, a fair comparison of the respective robustness of the model identification procedures is difficult. In summary, however, robust identification techniques tolerate model structural errors and deliver both a model and an estimate of uncertainty, as required by the robust control design.

While there are many theoretical modeling techniques, model identification techniques used in engineering software and applied to perform identification in complex industrial processes is generally designed for easy use and therefore has less options for selecting the modeling techniques or the order of the modeling equations than typical research/academic software. Therefore, in cases in which the process dynamics are significantly more complex than the assumed model, the assumed model to be identified should have wider uncertainty intervals for the model parameters. As noted above, the model uncertainty as defined by confidence intervals is established by or is related to the random noise level in the data. Thus, in many cases, if the noise level is not sufficient to create uncertainty ranges wide enough for encompassing acceptable parameter values (which conditions often exist when identifying a process with significant non-linearity, cascaded MPC or simulated processes and when random noise level is very low or not present at all), the identification procedure may not converge to the acceptable model parameters.

Therefore, the term robust identification is used herein to encompass the procedure for providing a reliable manner of obtaining a process model for the assumed model complexity from poor and unreliable data with respect to model parameter convergence. The confidence intervals analysis is used, and as illustrated herein, the test results provide evidence that the addition of random noise improves identification robustness by increasing confidence intervals of the identified models.

To be clearer, however, the concept of confidence levels will be described in more detail below. In particular, step response modeling, proven to be effective in DMC applications, is the most common form of model representation for MPC, as step response modeling makes the prediction of process outputs available explicitly. Future prediction is used to compute the predicted error vector as an input to the MPC controller.

The actual forms of a step response model are known. Considering a single-input-single output process, the differential FIR model is:

$$\Delta y_k = \sum_{i=1}^{p} h_i \Delta u_{k-i} \tag{1}$$

where p is the prediction horizon and the $h_i$ are the identified model coefficients. Typically, 30 to 120 coefficients are required for an impulse response to describe the dynamics of a simple first order plus dead time process. However, identifying the step response with the full prediction horizon and as many as 120 coefficients (especially in the multiple-input-multiple-output case) causes overfitting and results in significant parameter uncertainty, a common problem for FIR identifiers. An ARX model, has significantly fewer coefficients than the FIR model and can be expressed as:

$$y_k = \sum_{i=1}^{A} a_i y_{k-i} + \sum_{i=1}^{V} b_i u_{k-d-i} \tag{2}$$

where A and V are the autoregressive and moving average orders of the ARX model, d denotes the dead time, and $a_i$, $b_i$ are the model coefficients. An order of four has been observed to satisfy most practical applications. As noted above with respect to FIG. 6, by using a short FIR horizon, the dead time can be identified and then used in determining the ARX model. For a multiple-input-multiple-output process, superposition is applied from each input (additive action) on every output. Finally, a unit step is applied on one of the inputs and the identified ARX model is used to obtain step responses for that input.

Generalizing, process model identification can be presented as a mapping of the measurement data set $Z_N^0$ into a model parameter estimate set $\hat{\theta}_N^0 = (\hat{\theta}(1), \ldots, \hat{\theta}(k), \ldots, \hat{\theta}(m))$ contained into parameters set $D_N$ [4]:

$$Z_N^0 \rightarrow \hat{\theta}_N^0 \in D_N \quad (3)$$

In the above FIR and ARX model representations, $\hat{\theta}(i)$ is $(h_i)$ and $(a_i, b_i)$, respectively. A very important property of any identification technique is convergence of $\hat{\theta}_N^0$ when number of samples N tends to infinity. Errors of data set $Z_N^0$ have random components. As a result, the set $\hat{\theta}_N^0$ is not a unique realization of the true model parameter set $\hat{\theta}^0$. In fact, there are infinite possible realizations $\hat{\theta}_N^0, \hat{\theta}_N^1, \ldots, \hat{\theta}_N^\infty$ of the true parameter set $\hat{\theta}^0$ developed from hypothetical data sets $Z_N^0, Z_N^1, \ldots, Z_N^\infty$. Therefore parameters estimate $\hat{\theta}_N^i$ occurs with some probability. From a practical perspective, it is more interesting to know the probability distribution of the difference $\hat{\theta}_N^i - \hat{\theta}^0$ as knowing this distribution provides quantitative uncertainties of the estimate $\hat{\theta}_N^i$.

The task is therefore in estimating $\hat{\theta}_N^i - \hat{\theta}^0$ without knowing $\hat{\theta}^0$. It has been proven that for large N, every parameter from the estimate $\hat{\theta}_N^i - \hat{\theta}^0$ asymptotically converges (with confidence level $\alpha$) to the normal distribution, with the density function:

$$P(|\hat{\theta}(k) - \theta(k)| > \alpha) \approx \frac{\sqrt{N}}{\sqrt{2\pi P_\theta^{(kk)}}} \int_{|x| > \alpha} e^{-x^2 N / 2 P_\theta^{(kk)}} dx \quad (4)$$

As seen from the equation (4) $P_\theta^{(kk)}$ is the variance of the parameter estimate $\hat{\theta}(k) - \theta(k)$. $P_\theta^{(kk)}$ is the k,k element of the covariance matrix $P_\theta$. The equation for estimating the covariance matrix is:

$$P_\theta = (Z_N^{0T} Z_N^{0T})^{-1} Z_N^{0T} e e^T Z_N^{0T} ((Z_N^{0T} Z_N^0)^{-1})^T \quad (5)$$

Here, $Z_N^0$ is the data set arranged in the same manner as used for identification (FIR or ARX in these examples); $Z_N^{0T}$ is transpose of $Z_N^0$; and e is set of errors between process outputs and model outputs.

However, applying equation (5) requires calculation of the process model first, in order to develop the error set. Alternatively, the covariance matrix $P_\theta$ can be defined directly from singular value decomposition (SVD) of the data matrix:

$$Z_N^0 = U S V^T \quad (6)$$

The matrices U, S, V are products of the SVD. Then, $$\text{cov}(a_j, a_k) = \sum_{i=1}^M \left( \frac{V_{ji} V_{ki}}{w_i^2} \right) \quad (7)$$

$$\text{var}(a_j) = \sum_{i=1}^M \left( \frac{V_{ji}}{w_i} \right)^2 \quad (8)$$

Here, the $V_{ji}$ are elements of the V matrix; $w_i$ are elements of the diagonal matrix S; M is the dimension of the matrix S.

The standard deviation of the model parameters is defined as:

$$\sigma(a_j) = \sqrt{\text{var}(a_j)} \quad (9)$$

This measure presents the model quality information in a more readily usable form than the error probability distribution provided above. Standard deviations of the model parameters establish the range of parameter value with a predefined probability. For example, a 95% confidence region means that the true parameter value lies in the region with a 95% probability. With the assumption of normal distribution of errors, the range of $2\sigma(a_j)$ around the identified parameter value defines the 95% confidence interval, the range of $3\sigma$ gives the 99% confidence interval, and so on.

From these parameter standard deviations $\sigma(a_j)$, it is possible to generate step responses in a similar way as from model parameters. The confidence regions are obtained over the prediction horizon, thus giving the range of response parameters such as gain and dead time. The 95% confidence interval boundaries are defined by the twice the standard deviation, and the comparison may be made by computing the step response and superimposing it on the original step response in both positive and negative directions. For 99% confidence intervals, three times the standard deviation is used to define the upper and lower confidence intervals.

Figure 7:
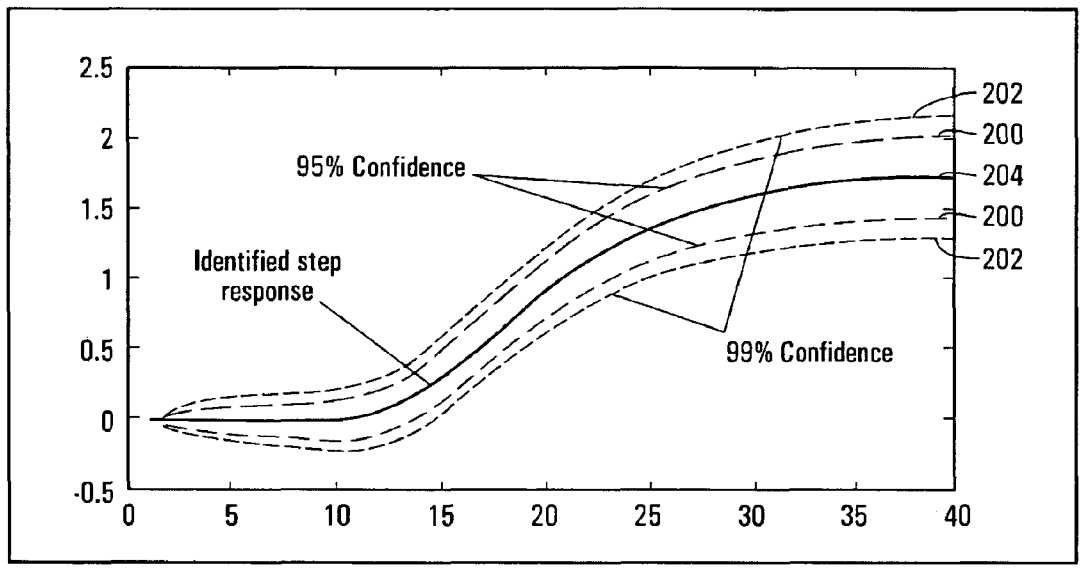
FIGS. 7-9 illustrate confidence interval plots showing the results of a non-parametric and a parametric model created using the robust model identification technique described herein.

An example of confidence intervals for a step response developed in Matlab from simulated data by applying SVD is shown in FIG. 7. The 95% and 99% confidence regions (lines 200 and 202, respectively) about the identified step response 204 are depicted. Naturally, the region becomes larger for higher probability and vice-versa. For MPC models, a ninety five percent confidence interval is believed to be satisfactory. A useful interpretation of this information is in establishing ranges of the step response parameters. For example, for the response of FIG. 7, the gain has a range between 1.4 and 2.05 with 95% confidence; and between 1.25 and 2.2 with 99% confidence. This information is applied towards estimating the parameters for robust controller generation. Having confidence intervals available for every step response in the process model make it possible not only to detect errors on the model output but also to identify specific step responses which may contribute the most to prediction errors.

Figure 8:
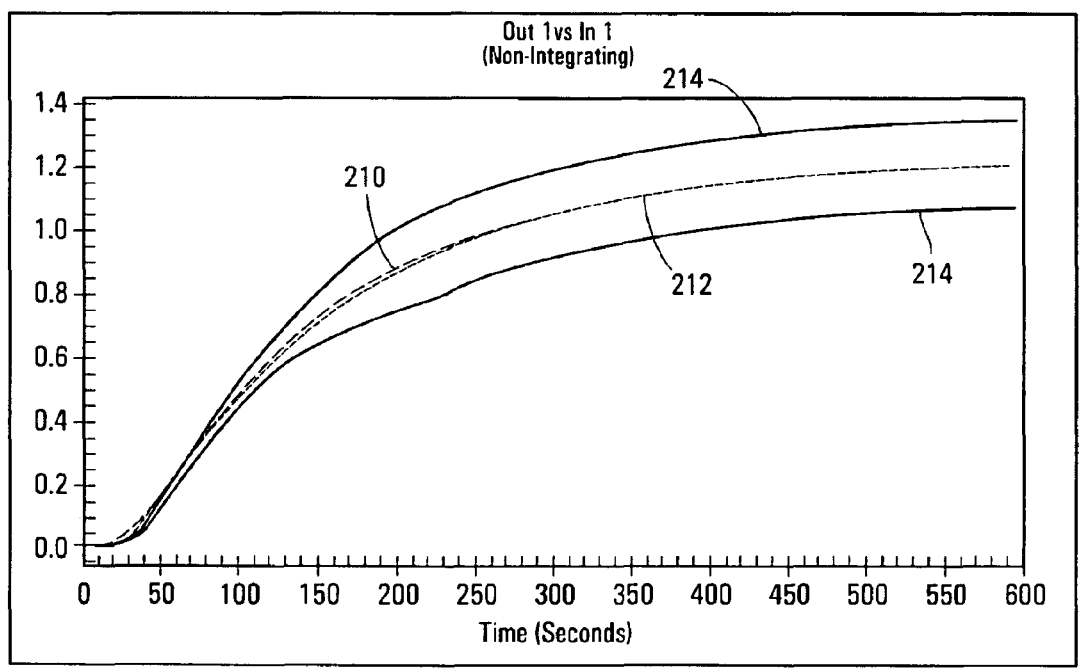

Having described the manner of defining the confidence levels, FIG. 8 illustrates a number of generated model validations specifics as defined by confidence intervals. As will be understood from the above discussion, and in particular from equations (6)-(9), the confidence intervals are dependant on the noise level of the data used for the model development. However to get model parameters within confidence intervals selecting an adequate model equation order is required. While this step is easy to identify, it is a task that is not always or easy achievable, especially in process control situations with complex process dynamics. Basically, selecting the type and order of the model equation requires a significant amount of expertise in the subject, typically much above a normal industry user. While selecting a higher than needed model order may provide a useful model, it automatically extends the program run time unnecessarily, which may be in the range of minutes or even hours. On the other hand, multilevel control systems usually require higher order equations than a typical user may assume. However, for the processes with significant non-linearity, selecting a higher model order may have a negative effect on the process identification, as there is no exact linear model for a non-linear process.

Assuming a high order model with the narrow confidence intervals as defined by the data may not lead to the generation of any model at all because model parameters will not converge into the narrow ranges. This type of process with non-linearity can be modeled more realistically by using a lower order linear model with wider confidence intervals. This selection is in full accordance with common sense engineering logic, i.e., if a process is non-linear, it is better to assume that the process gain changes within a wider range rather than to increase the dynamics order. The conclusion is that, for practical applications, particularly in processes with non-linearity, it is beneficial to have reasonable confidence intervals rather than higher order models. In many cases this situation is satisfied automatically, because the data noise level is adequate. However, as indicated above, to guarantee model convergence in many or most circumstances, random noise can be added to the process output data after test data collection and preprocessing, i.e. normalizing and removing mean values to widen the confidence intervals.

Figure 9:
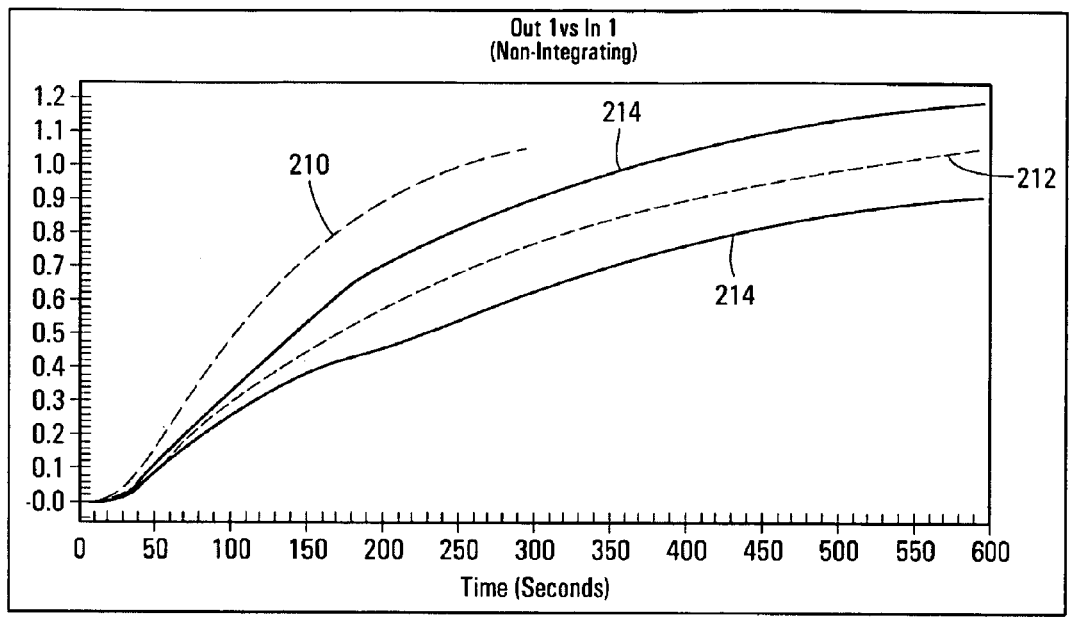
Figure 10:
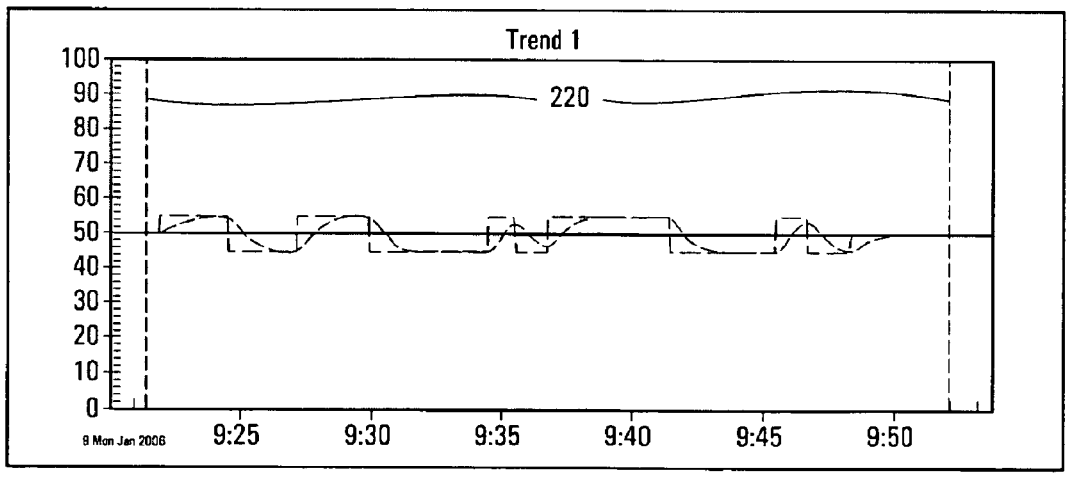
FIGS. 10-20 illustrate the performance of a process model generation technique using process data having noise added thereto for both an FIR model and an ARX model for various different test data.

The effect of adding random noise to the process data is very clearly demonstrated in a simulation test, in which adding 0.25 percent amplitude noise to the data makes it possible to develop a good model when a model was not achievable at all with noiseless data. For example, FIG. 8 illustrates an almost perfect match between an FIR model 210 and an ARX model 212 after adding zero-mean, 0.25 percent maximum amplitude noise to the process data, along with the 95 percent confidence intervals 214. FIG. 9 illustrates the results obtained by adding zero-mean, 0.25 percent maximum amplitude noise to only 120 samples out of 919 no-noise samples, which again improved ARX model 212 convergence, although the match with the FIR model 210 was not perfect. Similar results were obtained by adding 0.1 percent maximum amplitude noise to all no-noise samples, which still resulted in improved ARX model convergence In validating the robust model generation concept described herein, it was discovered that the sensitivity to error in the dead time estimates generally decreases with noise amplitude. A couple of specific tests illustrating the effects of adding noise will now be described below. In particular, these tests used a single loop process defined as a second order process with Gain=1, DT=2, $T_1=T_2=20$ (where DT is the dead time, and $T_1$ and $T_2$ are the first and second order time constants of the parametric model). In these tests, a time to steady state $T_{ss}$ of 240 was used during model identification. The data used in the test is shown in the selection area 220 between 9:21-9:52 i.e., 31 minutes of data of FIG. 10. Without the addition of noise to the data, the ARX model identification procedure provided no second order time constant, determined a gain that was too small and a dead time that was too large. While the FIR model determination procedure determined an FIR model, the dead time of the FIR model was zero, which is not correct. In an attempt to fix these problems, the prior art techniques of manually increasing the number of parameters, adding more process data, and increasing step size of process upset input were attempted, generally without significant improvement in the model identification.

Figure 11:
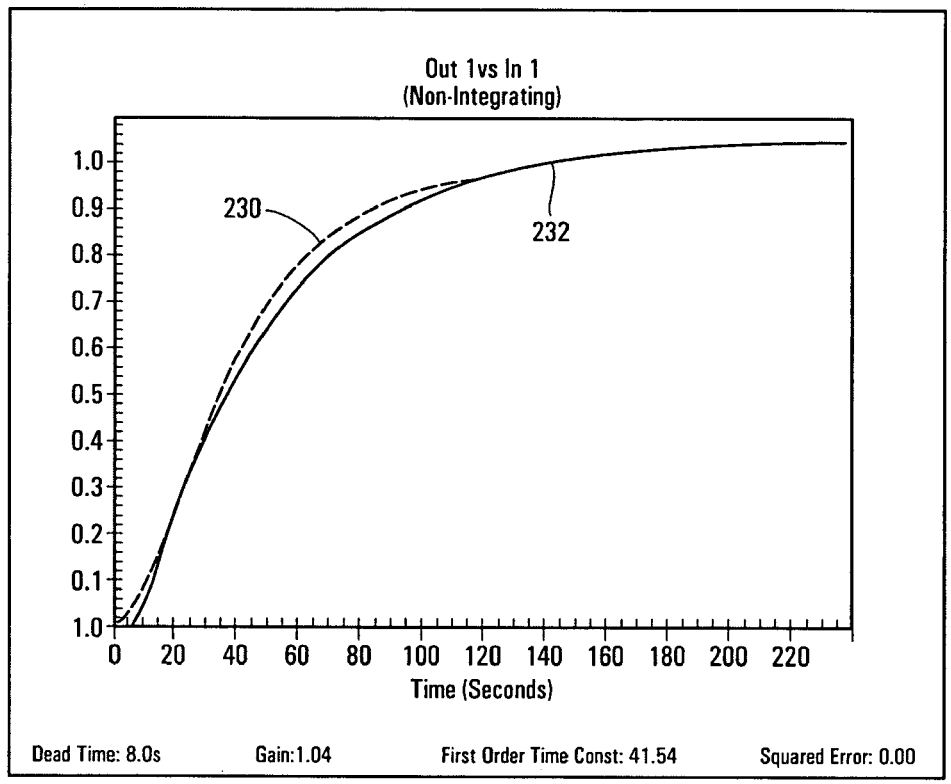
Figure 12:
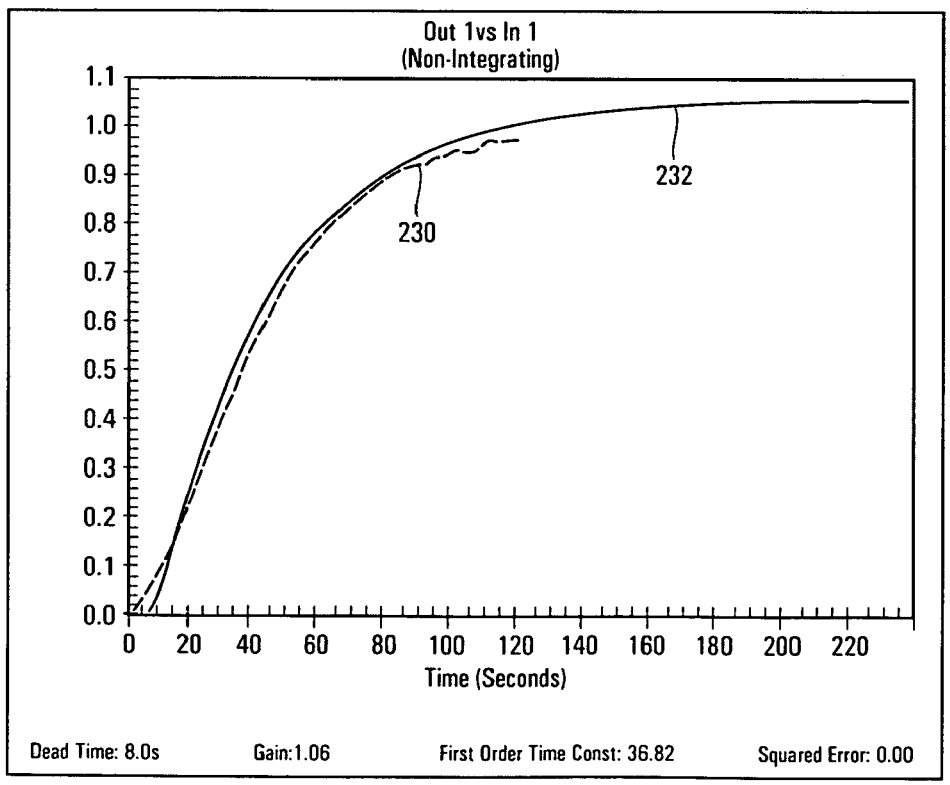
Figure 13:
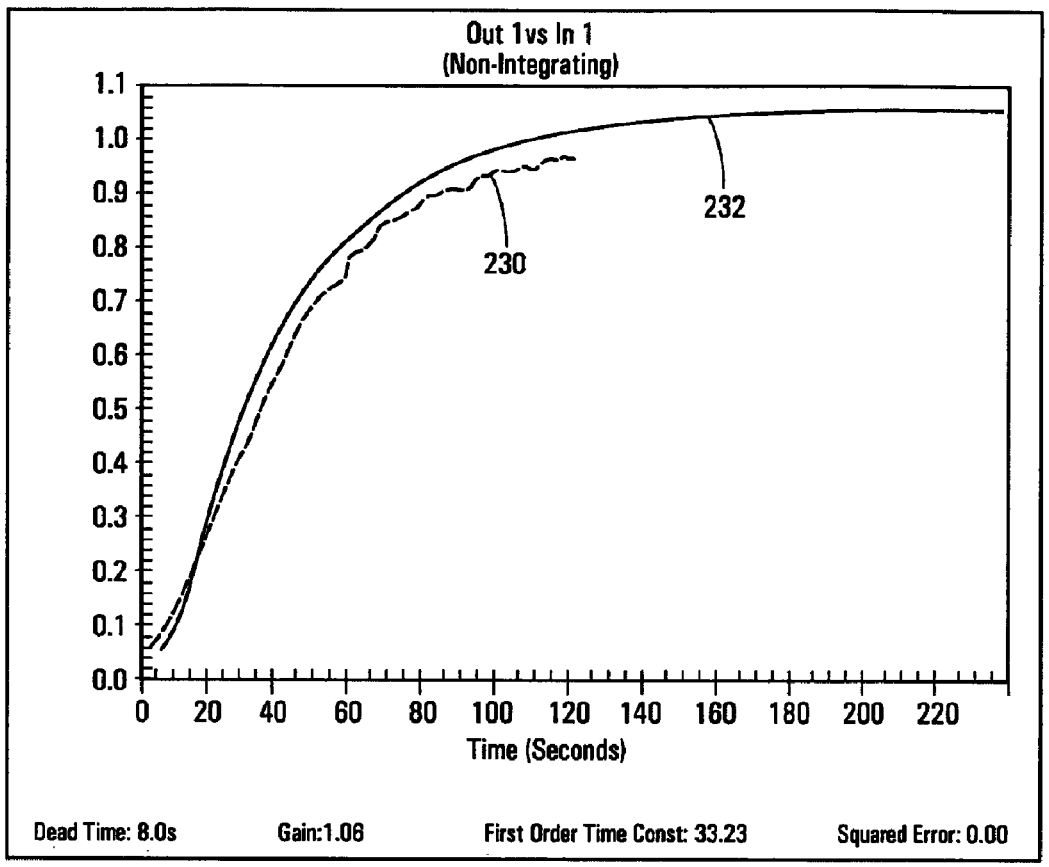

However, upon adding artificial noise to process data after the process upset test, significant improvements to model quality were observed. In fact the results of adding 0.3%, 0.4% and 0.5% (maximum amplitude) evenly distributed, zero-mean ransom noise to the data are indicated in FIGS. 11-13 for both the FIR model 230 and the ARX model 232 model. As will be seen, it appears that a maximum noise amplitude of 0.4% of scale seems to be optimal in this case as this provides the closest match between the FIR and the ARX model.

Figure 14:
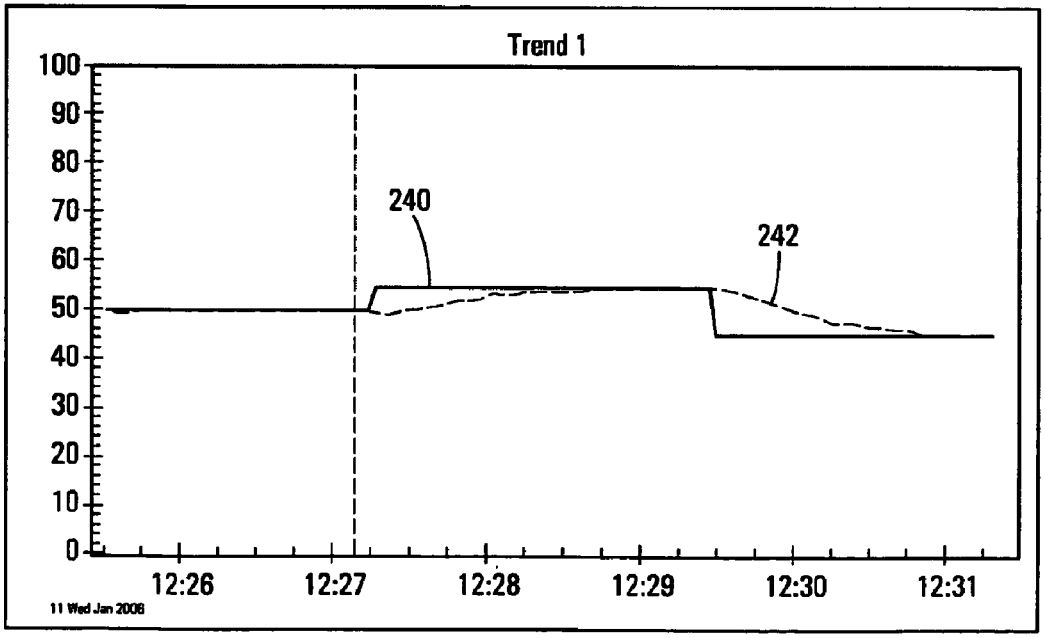
Figure 15:
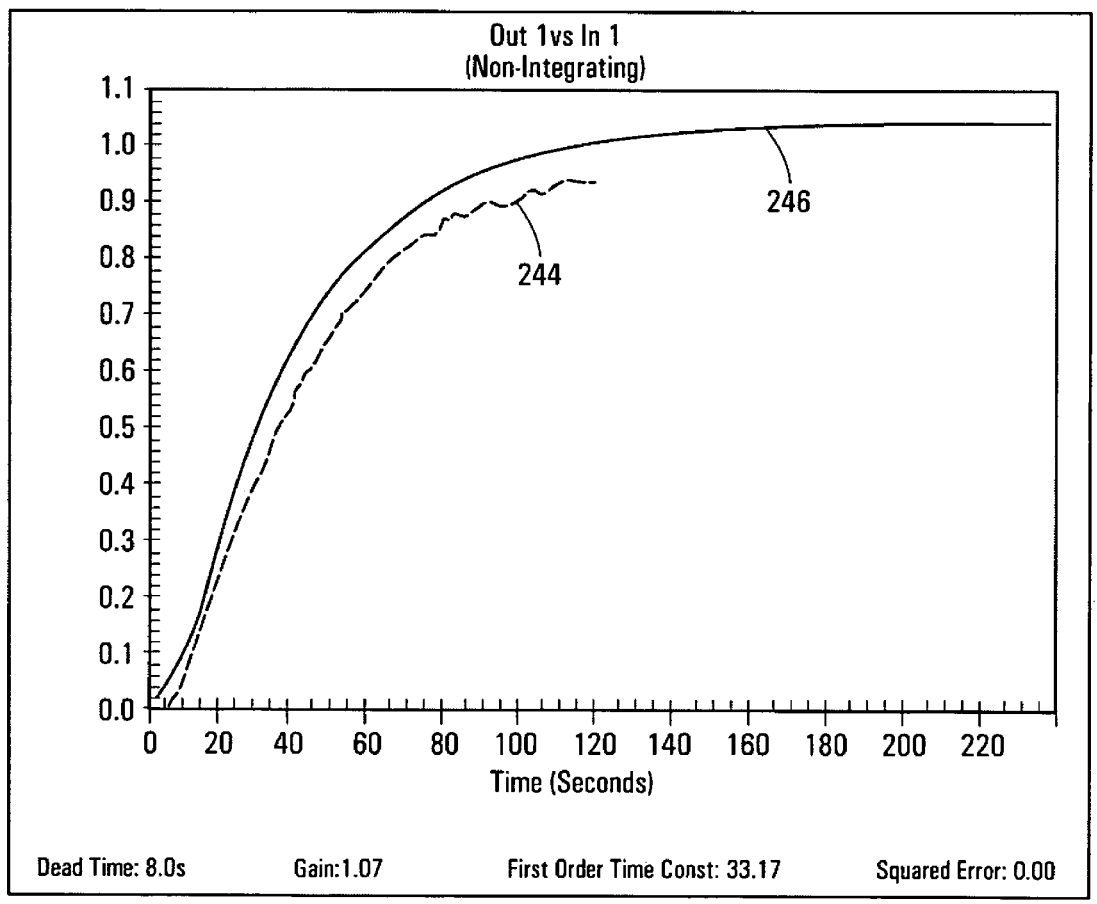

Still further, it was determined that noise could be added to the process inputs instead of to the data collected by the process upset test. In particular, significant improvement in parametric model identification was determined when a test cycle was run with noise added to the output of the signal generator that was used to upset the process to perform the process test. FIG. 14 illustrates the desired process upset signal 240 to which 0.4 percent maximum amplitude, evenly distributed, zero-mean, random noise was added and the collected process output data 242 resulting from this noisy test signal. FIG. 15 illustrates the resulting FIR model performance 244 and ARX model performance 246 based on the process data collected using the noisy process upset signal.

Figure 16:
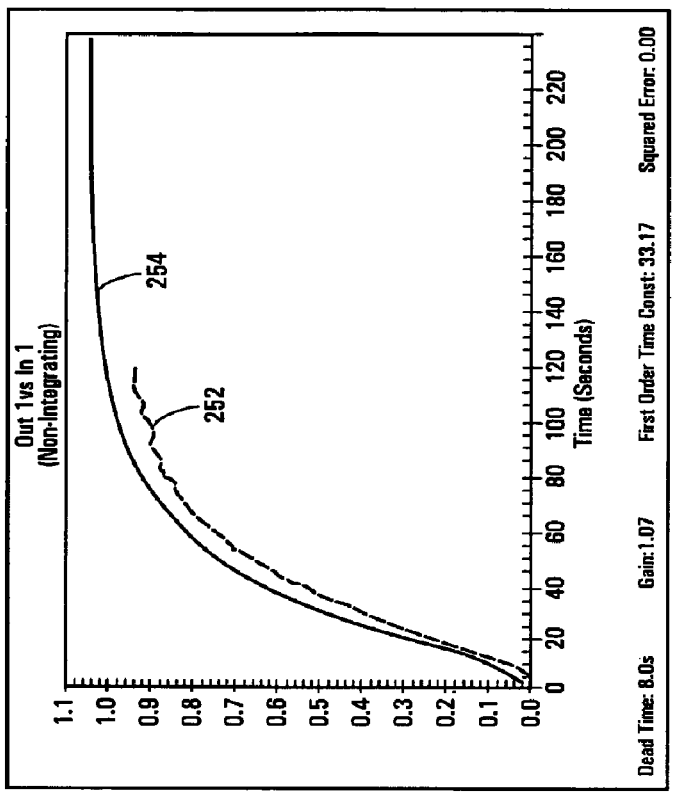
Figure 16:
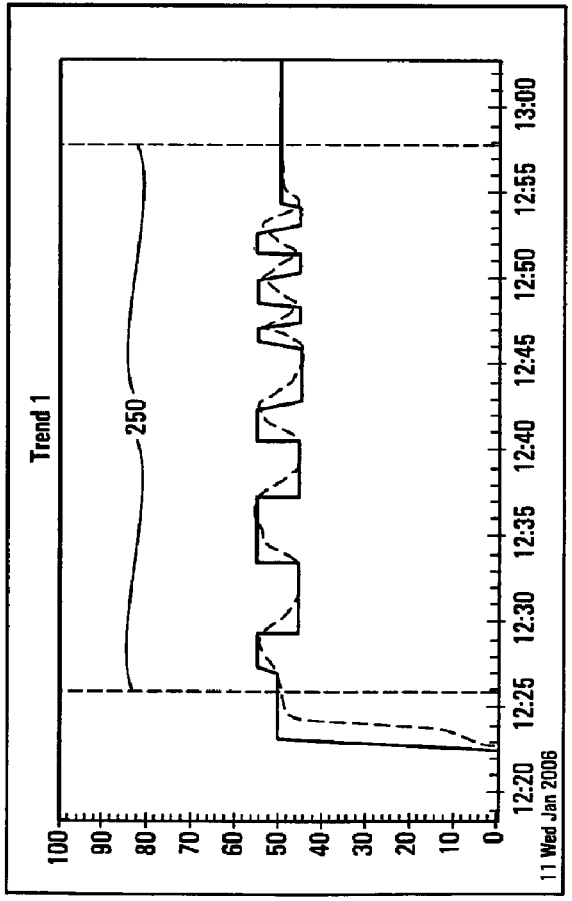
Figure 17:
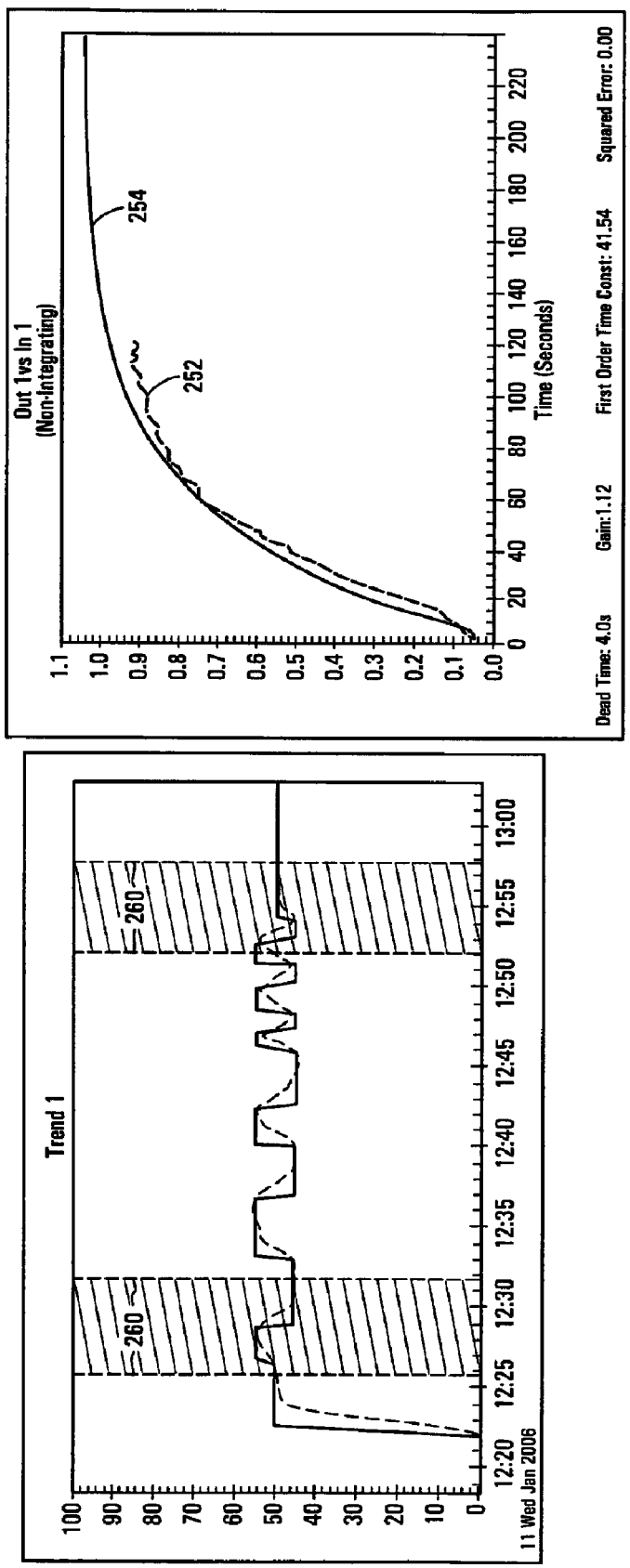
Figure 18:
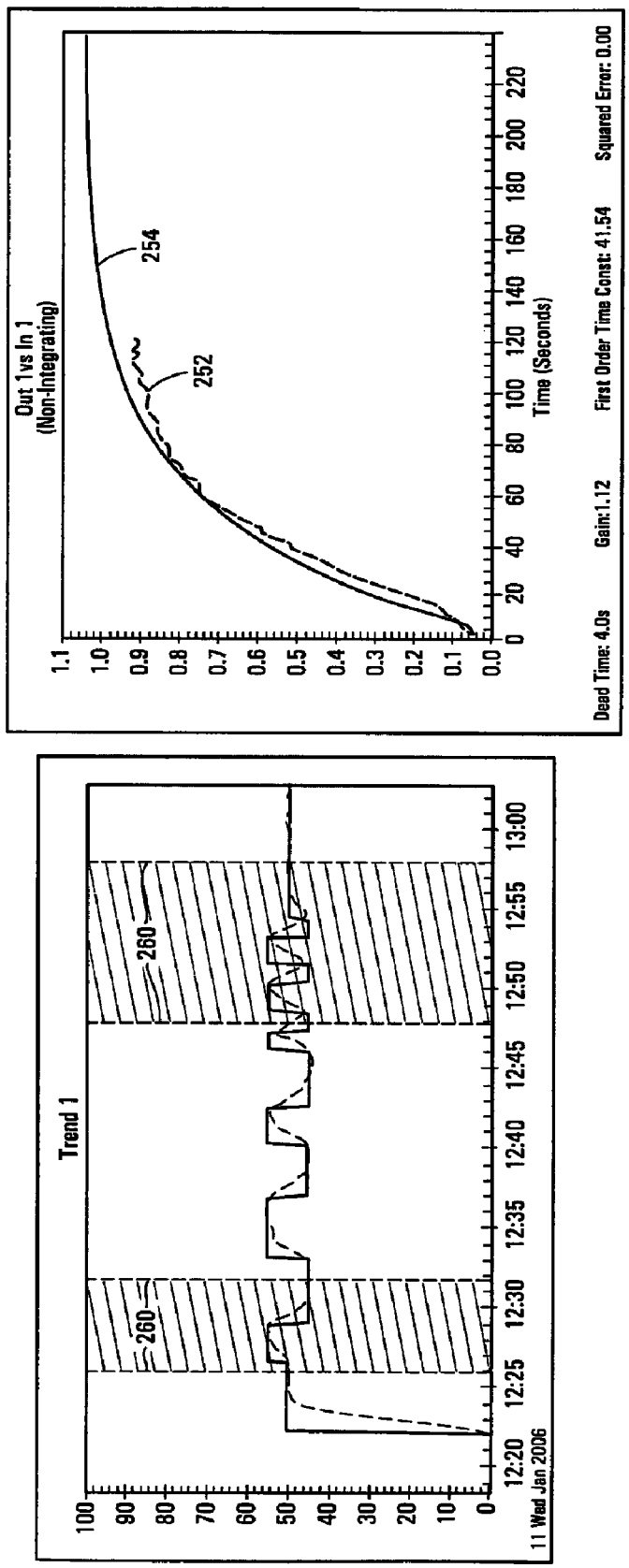
Figure 19:
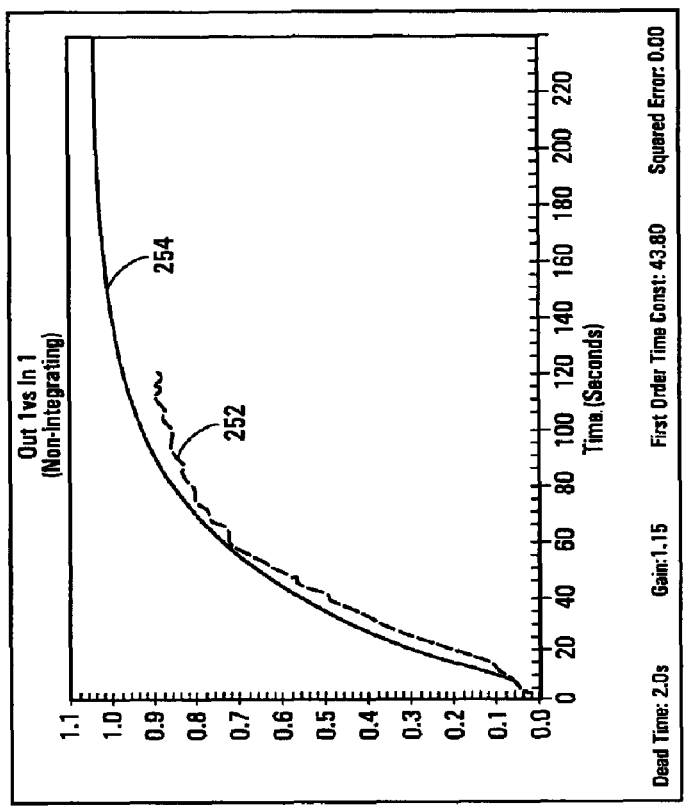
Figure 19:
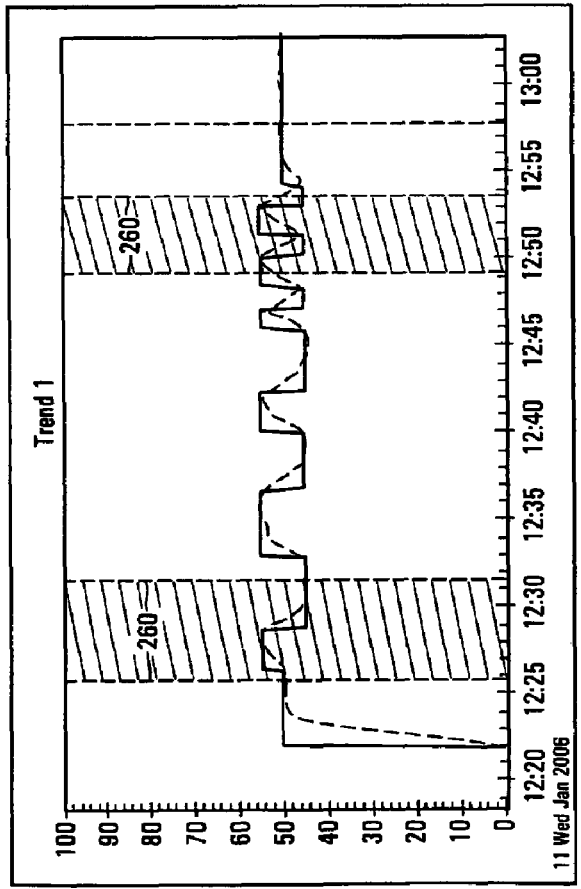
Figure 20:
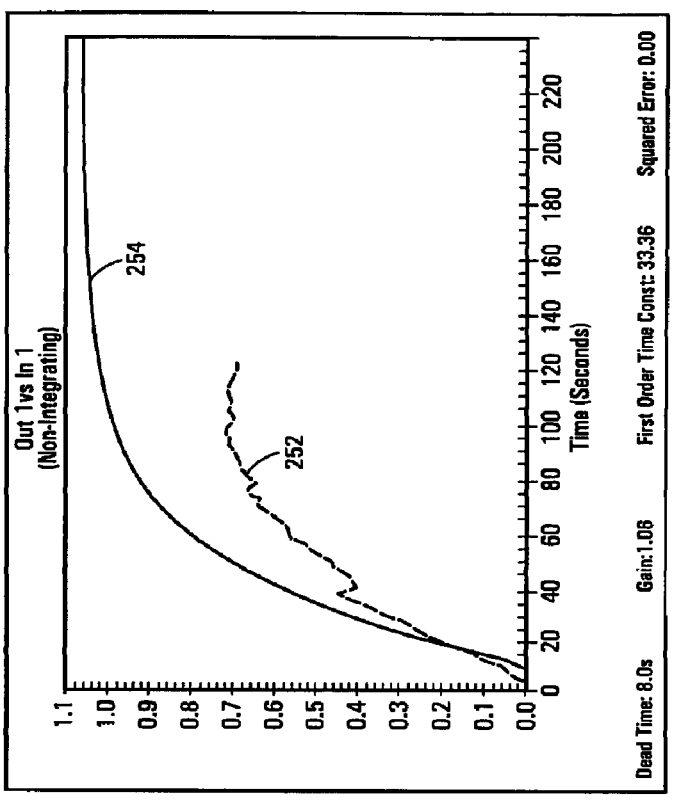
Figure 20:
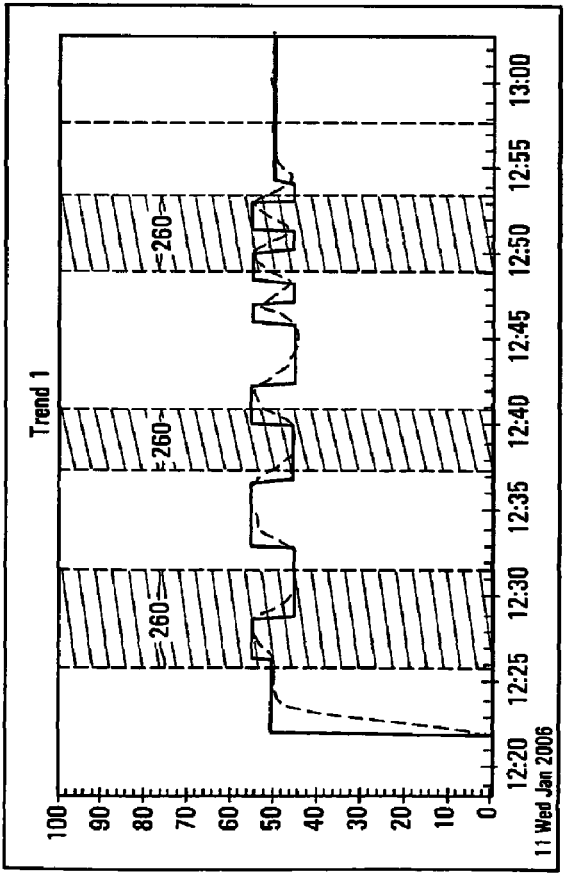

Likewise, it was determined that adding 0.4% maximum amplitude, evenly distributed, zero-mean, random noise to process data that already included 0.4% real noise produces an almost identical result with respect to model identification. Still further, it was generally determined that significant amounts of process data can be excluded from use in creating the model, when noise is added to the remaining data, and still be able to produce adequate models. In particular, the ARX model generation routine performed as expected regardless of where missing data was located and, while the FIR model generation routine broke down first, it still was able to produce models in the presence of some missing data. The left hand plot of FIG. 16 illustrates a complete test data set 250 used in this test, while the resulting model performances for the FIR model (252) and the ARX model (254) are illustrated on the right side of the FIG. 16. It is noted that the FIR model 252 was only computed to about 60 scans to reduce the computations needed to generate this model. FIGS. 17-20 illustrate the effect on the FIR and ARX model performances (252 and 254, respectively) when excluding test data as indicated in the excluded areas 260 in the left hand plots of these figures. In each of these cases, 0.4% maximum amplitude, evenly distributed, zero-mean, random noise was added to the process output test data illustrated on the left side of these figures. As will be noted, the FIR model 252 broke down first, especially when excluding data from multiple non-contiguous regions of the data set, but that a significant amount of data could be excluded from the test while still being able to develop process models.

Similar tests were performed on multivariable processes with the same general conclusions, i.e., that better model identification performance was obtained by adding zero-mean, random noise to the process test data, that the sensitivity to error in the dead time estimates decreased with noise amplitude, that process gain estimates were generally better (with FIR model generation generally producing better gain estimates than ARX model generation), and that a significant amount of process data can be excluded from the test, including data within the middle of the data set, and still be able to generate a process model (with ARX model generation being more tolerant to missing data than FIR model generation). Still further, it is noted that while the technique of adding noise to the test data did not significantly improve the developed FIR models and, depending on the amount of noise added, may have made these models slightly worse, it did not significantly reduce the accuracy of the FIR models until the data set used to create the model was severely limited. However, it was found that adding random noise to the test data significantly increased the ability of the ARX model determination routine to converge and thereby determine a complete set of model parameters, thus making this process model creation routine more robust.

Thus, as described above, confidence intervals strongly relate to the noise. Therefore, confidence intervals can be easily widened by superimposing a small level of random noise on the test data. The observation leads to a technique for improving model parameters convergence by widening confidence intervals and leads to a technique that is able to achieve a model from data that has not before provided model parameters convergence, and to do so with widened confidence intervals. As a result, the robustness of the process model development has been significantly increased.

As will be understood, the MPC or advanced control logic generation routines and methods described herein enable a user to create advanced control blocks such as MPC control blocks, neural network modeling or control blocks, etc. without having a great deal of expert knowledge about how those blocks are created and enables an operator to create and use an advanced control block without performing a lot of reprogramming of the process to implement advanced control and without generally needing to alter the process test setup to determine an adequate process model.

While the advanced control blocks, the process simulation blocks and the associated generation and testing routines have been described herein as being used in conjunction with Fieldbus and standard 4-20 ma devices, they can, of course, be implemented using any other process control communication protocol or programming environment and may be used with any other types of devices, function blocks or controllers. Moreover, it is noted that the use of the expression "function block" herein is not limited to what the Fieldbus protocol or the DeltaV controller protocol identifies as a function block but, instead, includes any other type of block, program, hardware, firmware, etc., associated with any type of control system and/or communication protocol that can be used to implement some process control function. Also, while function blocks typically take the form of objects within an object oriented programming environment, this need not be the case.

Although the advanced control blocks, process model creation routines, the process simulation blocks and the associated generation and testing routines described herein are preferably implemented in software, they may be implemented in hardware, firmware, etc., and may be executed by any other processor associated with a process control system. Thus, the routine 40 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of generating a process model for a process implemented on one or more physical devices, comprising:
  collecting process data indicative of process operation from the process implemented on the one or more physical devices;
  after collecting the process data and prior to determining the process model for the process implemented on the one or more physical devices, adding noise to the process data to produce conditioned process data;
  determining the process model for the process implemented on the one or more physical devices from the conditioned process data including the added noise; and
  generating, based on the determined process model, parameters used to control the process.

2. The method of claim 1, wherein collecting process data includes upsetting the process using a known process upset signal and collecting process data indicative of a process response to the process upset signal.

3. The method of claim 2, wherein adding noise to the process data comprises adding noise to a process output signal which is indicative of the process response to the process upset signal.

4. The method of claim 2, further comprising adding noise to the process upset signal prior to upsetting the process using the process upset signal to thereby add noise to data being collected as the collected process data.

5. The method of claim 1, wherein determining the process model includes determining one or more parameters of a parametric process model.

6. The method of claim 5, wherein determining the process model includes determining one or more parameters of an auto-regressive with external inputs process model.

7. The method of claim 1, wherein determining the process model includes determining a non-parametric process model.

8. The method of claim 7, wherein determining the process model includes determining a finite impulse response process model.

9. The method of claim 1, wherein adding noise to the process data to produce the conditioned process data includes adding random noise to the process data.

10. The method of claim 9, wherein adding random noise to the process data includes adding zero-mean noise to the process data.

11. The method of claim 10, wherein adding random noise to the process data includes adding evenly distributed random noise with a maximum amplitude between 0.2 and 0.5 percent of the range of the collected process data.

12. The method of claim 10, wherein adding random noise to the process data includes adding evenly distributed random noise with a maximum amplitude of approximately 0.4 percent of the range of the collected process data.

13. The method of claim 1, wherein determining the process model from the conditioned process data includes estimating a process dead time for the process from the collected process data, and using the dead time and the conditioned process data to determine the process model.

14. The method of claim 13, wherein estimating the process dead time includes generating a further process model from the collected process data and determining an estimate of the process dead time from the further process model.

15. The method of claim 14, wherein generating the further process model includes generating a finite impulse response model.

16. The method of claim 1, further including screening the collected process data or the conditioned process data prior to generating the process model from the conditioned process data.

17. The method of claim 1, wherein adding noise to the process data includes determining an amplitude of the noise as a function of the collected process data.

18. The method of claim 17, wherein determining an amplitude of the noise includes determining an amplitude of the noise as a function of the range of the collected process data, a mean of the collected process data or a standard deviation of the collected process data.

19. The method of claim 1, wherein adding noise to the process data includes determining an amplitude of the noise as a function of a process input signal used to generate the process data indicative of process operation.

20. A model generation system for generating a process model from a process implemented on one or more physical devices in a process control environment including one or more processors and a computer readable memory, the model generation system comprising:
   a first routine stored on the computer readable memory and executable on at least one of the one or more of the processors to collect from the process implemented on the one or more physical devices in the process control environment, process data indicative of process operation for at least a portion of the process;
   a second routine stored in the computer readable memory and executable on at least one of the one or more of the processors to, after collecting the process data and prior to generating the process model, add noise to the process data to produce conditioned process data; and
   a model generation routine stored in the computer readable memory and executable on at least one of the one or more of the processors to determine the process model for the process implemented on the one or more physical devices from the conditioned process data including the added noise.

21. The model generation system of claim 20, wherein the model generation routine is a parametric model generation routine that is executable to generate a parametric model by determining one or more parametric model parameters from the conditioned process data.

22. The model generation system of claim 21, wherein the model generation routine is an auto-regressive with external inputs process model generation routine.

23. The model generation system of claim 21, wherein the model generation routine includes a process parameter routine that is executable to estimate a dead time of the process and a model parameter estimation routine that is executable to determine the one or more parametric model parameters from the conditioned process data and the estimate of the process dead time.

24. The model generation system of claim 23, wherein the process parameter routine is executable to produce anonparametric model for the process and determines the process dead time from the non-parametric model.

25. The model generation system of claim 24, wherein the process parameter routine is executable to produce a finite impulse response model as the non-parametric model.

26. The model generation system of claim 20, further including a third routine stored on a computer readable memory and executable on at least one of the one or more of the processors to produce a process controller using the process model.

27. The model generation system of claim 26, wherein the process controller is a model predictive control based controller.

28. The model generation system of claim 20, wherein the first routine includes a signal generator routine that is executable to produce a known process upset signal to upset the process and a collection routine that is executable to collect process data indicative of a process response to the process upset signal.

29. The model generation system of claim 28, wherein the first routine is further executable to add noise to the process upset signal so that the collected process data indicative of the process response is at least a portion of the conditioned process data.

30. The model generation system of claim 29, wherein the second routine is executable to add zero-mean, random noise to the process upset signal.

31. The model generation system of claim 30, wherein the second routine is executable to enable a user to select a magnitude associated with the zero-mean, random noise to be added to the process upset signal.

32. The model generation system of claim 20, wherein the second routine is executable to add zero-mean, random noise to the process data.

33. The model generation system of claim 32, wherein the second routine is executable to enable a user to select a magnitude associated with the zero-mean, random noise to be added to the process data.

34. The model generation system of claim 32, wherein the second routine is executable to add evenly distributed random noise with a maximum amplitude between 0.2 and 0.5 percent of the range of the process data.

35. The model generation system of claim 32, wherein the second routine is executable to add evenly distributed random noise with a maximum amplitude of approximately 0.4 percent of the range of the process data.

36. The model generation system of claim 20, wherein the second routine is executable to determine an amplitude of the noise added to the process data as a function of the process data.

37. The model generation system of claim 36, wherein the second routine is executable to determine the amplitude of the noise as a function of a range or a mean or a standard deviation of the process data.

38. The model generation system of claim 20, wherein the second routine is executable to determine an amplitude of the noise added to the process data as a function of a process input signal used to generate the process data.

39. A method of generating a control or simulation block for controlling or simulating at least a portion of a process, comprising:
   delivering a known process upset signal to the process to cause the process to undergo a change;
   collecting from the process, process data indicative of a response to the process upset signal;
   after collecting the process data and prior to determining any process model corresponding to the process data, adding noise to the process data to produce conditioned process data;
   determining a process model from the conditioned process data including the added noise; and
   generating the control or simulation block using parameters generated based on the determined process model.

40. The method of claim 39, further comprising adding noise to the process upset signal prior to delivering the process upset signal to the process to thereby add noise to collected process data.

41. The method of claim 39, wherein determining the process model includes determining one or more parameters of a parametric process model.

42. The method of claim 41, wherein determining the process model includes determining one or more parameters of an auto-regressive with external inputs process model.

43. The method of claim 39, wherein determining the process model includes determining a non-parametric process model.

44. The method of claim 39, wherein adding noise to the process data to produce conditioned process data includes adding random noise to the process data.

45. The method of claim 44, wherein adding random noise to the process data includes adding zero-mean noise to the process data.

46. The method of claim 45, wherein adding noise to the process data includes adding evenly distributed random noise with a maximum amplitude between 0.2 percent and 0.5 percent of the range of the process data.

47. The method of claim 45, wherein adding noise to the process data includes adding evenly distributed random noise with a maximum amplitude of approximately 0.4 percent of the range of the process data.

48. The method of claim 39, wherein determining the process model from the conditioned process data includes estimating a process dead time for the process from the process data, and using the estimated dead time and the conditioned process data to determine the process model.

49. The method of claim 48, wherein estimating the process dead time includes generating a further process model from the process data and determining an estimate of the process dead time from the further process model.

50. The method of claim 39, further including screening the process data or the conditioned process data prior to generating the process model from the conditioned process data.

51. The method of claim 39, wherein generating the control or simulation block using the determined process model includes generating a model predictive control block.

52. The method of claim 51, wherein generating the model predictive control block includes generating a multiple-input-multiple-output controller.

53. The method of claim 39, wherein generating the control or simulation block using the determined process model includes generating single-input-single-output control block.

54. The method of claim 39, wherein determining a process model from the conditioned process data includes determining a single-input-single-output process model.

55. The method of claim 39, wherein adding noise to the process data includes determining an amplitude of the noise as a function of the process data.

56. The method of claim 55, wherein determining an amplitude of the noise includes determining an amplitude of the noise as a function of the range of the process data, a mean of the process data or a standard deviation of the process data.

57. The method of claim 39, wherein adding noise to the process data includes determining an amplitude of the noise as a function of a process upset signal.

* * * * *